United States Patent
Smith et al.

(10) Patent No.: US 8,040,328 B2
(45) Date of Patent: Oct. 18, 2011

(54) BOOKS, PAPERS, AND DOWNLOADED INFORMATION TO FACILITATE HUMAN INTERACTION WITH COMPUTERS

(76) Inventors: Peter Smith, Ann Arbor, MI (US); Timothy R Pryor, Windsor (CA)

(*) Notice: Subject to any disclaimer, the term of this patent is extended or adjusted under 35 U.S.C. 154(b) by 838 days.

(21) Appl. No.: 11/980,718

(22) Filed: Oct. 31, 2007

(65) Prior Publication Data
US 2008/0122805 A1    May 29, 2008

Related U.S. Application Data

(63) Continuation of application No. 09/974,250, filed on Oct. 10, 2001, now abandoned.

(60) Provisional application No. 60/239,618, filed on Oct. 11, 2000, provisional application No. 60/246,344, filed on Nov. 7, 2000.

(51) Int. Cl.
*G06F 3/042* (2006.01)

(52) U.S. Cl. .................. 345/175; 345/156; 345/173

(58) Field of Classification Search .......... 345/173–180, 345/156–158
See application file for complete search history.

(56) References Cited

U.S. PATENT DOCUMENTS

| | | |
|---|---|---|
| 5,742,041 A | 4/1998 | Liu |
| 5,782,598 A | 7/1998 | Salzberger |
| 5,982,352 A | 11/1999 | Pryor |
| 6,008,000 A | 12/1999 | Margolskee |
| 6,041,215 A | 3/2000 | Maddrell et al. |
| 6,098,882 A | 8/2000 | Antognini et al. |
| 6,124,851 A | 9/2000 | Jacobson |
| 6,144,380 A | 11/2000 | Shwarts et al. |
| 6,281,878 B1 * | 8/2001 | Montellese ............ 345/156 |
| 6,301,763 B1 | 10/2001 | Pryor |
| 6,545,670 B1 | 4/2003 | Pryor |
| 6,720,949 B1 | 4/2004 | Pryor et al. |
| 6,750,848 B1 | 6/2004 | Pryor |
| 6,922,779 B1 * | 7/2005 | Lapstun et al. ........... 713/182 |
| 7,015,950 B1 | 3/2006 | Pryor |
| 7,098,891 B1 | 8/2006 | Pryor |
| 2002/0036617 A1 | 3/2002 | Pryor |

* cited by examiner

*Primary Examiner* — Kimnhung Nguyen
(74) *Attorney, Agent, or Firm* — Stites & Harbison PLLC; Douglas E. Jackson

(57) ABSTRACT

Disclosed are simple easy to understand TV camera based input and programming devices for computers, as well as local or remote means to assimilate data or commands. The invention in one preferred embodiment, uses printed matter imaged by one or more TV cameras, which results in enhanced ease of comprehension, distribution and touch command input of programs. The printed matter may be for example, newspaper clippings, children's books, chess boards, or board games. Certain aspects of the invention share some characteristics of a touch screen, in the sense of additionally determining the location of objects positioned by a user, or portions of a user, such as fingers or hands.

3 Claims, 23 Drawing Sheets

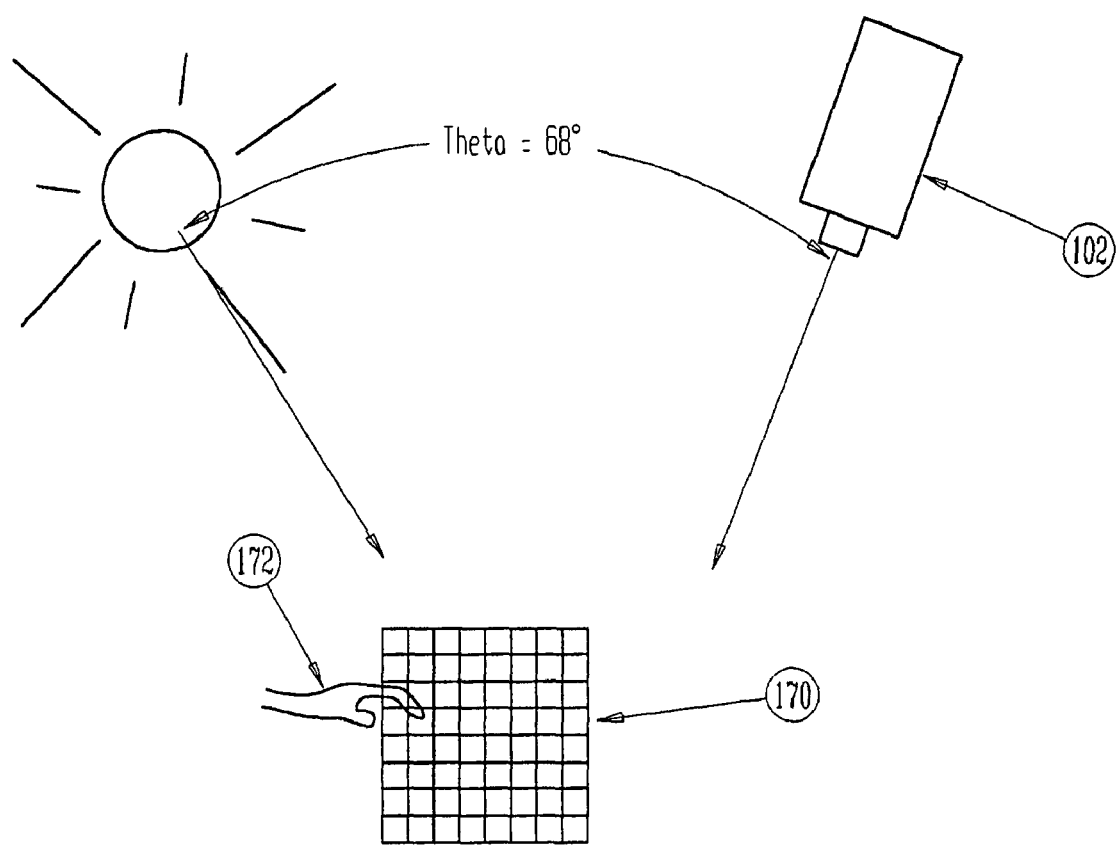

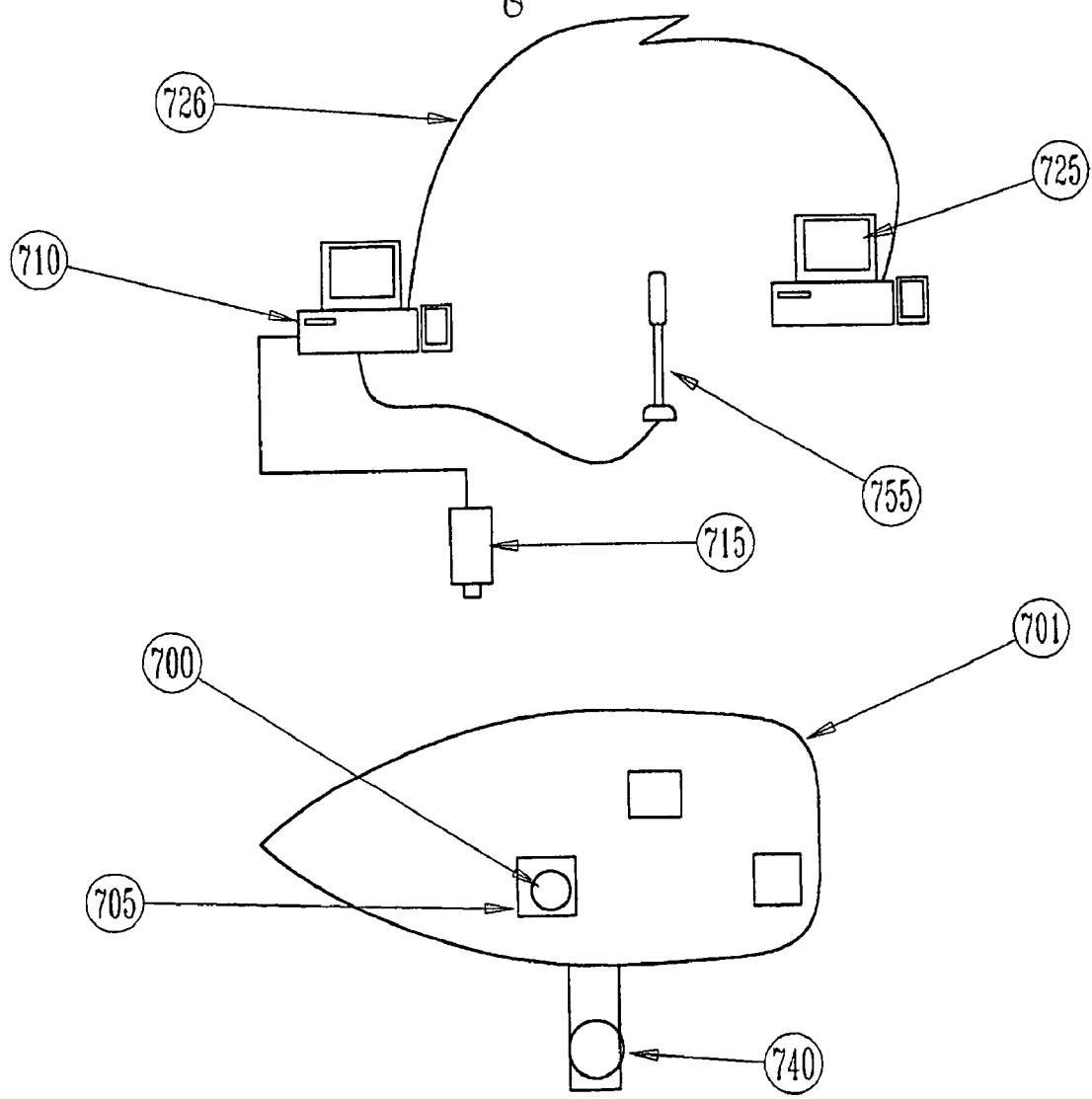

BOOKS, PAPERS, AND DOWNLOADED INFORMATION TO FACILITATE HUMAN INTERACTION WITH COMPUTERS

CROSS REFERENCE TO RELATED APPLICATIONS

This application is a continuation of Ser. No. 09/974,250 filed Oct. 10, 2001 now abandoned; which claims benefit of Provisional patent applications "Infantlink", Ser. No. 60/239,618, filed Oct. 11, 2000 and "Coded Optical Program Generation and Interaction", Ser. No. 60/246,344, filed Nov. 7, 2000. The disclosures of which are incorporated by reference herein.

CROSS REFERENCES TO RELATED APPLICATIONS BY THE INVENTORS

Tim Pryor and Peter Smith, Novel Man machine interfaces and applications, U.S. Ser. No. 09/138,285, the disclosure of which is incorporated by reference herein.

CROSS REFERENCES TO RELATED APPLICATIONS BY ONE OF THE INVENTORS

Tim Pryor

1. Touch TV and other Man Machine Interfaces (Ser. No. 09/435,854 which was a continuation of application Ser. No. 07/946,908, now U.S. Pat. No. 5,982,352; and U.S. Pat. No. 6,008,000, the disclosure of which is contained in that of 09/435,854;
2. More Useful Man Machine Interfaces and application Ser. No. 09/433,297;
3. Useful Man Machine interfaces and application Ser. No. 09/138,339;
4. Vision Target based assembly, U.S. Ser. No. 08/469,907;
5. Picture Taking method and apparatus Ser. No. 09/568,552
6. Methods and Apparatus for Man Machine Interfaces and Related Activity, U.S. Ser. No. 09/568,554
7. Tactile Coded Optical Program Interfaces for Automobile Telematics and Control Applications, Ser. No. 60/246,353 the disclosures of which is incorporated by reference herein.

FEDERALLY SPONSORED R AND D STATEMENT

Not Applicable

MICROFICHE APPENDIX

Not Applicable

FIELD OF THE INVENTION

The invention concerns simple easy to understand TV camera based input and programming devices for computers, as well as local or remote means to assimilate data or commands. The invention in one preferred embodiment, uses printed matter imaged by one or more TV cameras, which results in enhanced ease of comprehension, distribution and touch command input of programs. The printed matter may be for example, newspaper clippings, children's books, chess boards, or board games. The invention further discloses use of simple material to provide preprogrammed inputs which also may serve as a method for human selection, much like a conventional touch screen or pad. Also disclosed are simple computer programming techniques with fixed sets of combinations, and disclosed new arrangements downloaded from the internet, or other sources.

BACKGROUND OF THE INVENTION

Numerous types of computer input apparatus exist today. The most common is a classic QWERTY Keyboard while for direct computer input for screen manipulation, the most common is the "Mouse" that is manipulated in x and y.

Touch screens (and less common, touch pads) are another form of input, generally more popular in commercial use, in which typically a certain zone on the screen is touched to indicate a command. Numerous examples exist in the art, and several prior art examples are given in the references above.

Each of the above examples is in wide use. But they all have a common shortcoming in that they are difficult for the very old, the very young, and the disabled. Of the group, the touch screen is the easiest to operate, since one can, with ones finger, directly touch an appropriate input icon displayed. But even when a special pen rather than ones finger is used, resolution in most cases is much more limited than what is achievable with a mouse and its associated pointer on the screen. And in home use, the touch screen is a significant added expense and encumbrance over a conventional display.

In addition, each of the common prior art devices above typically is used with a vertically positioned display. While the mouse and keyboard are used on flat horizontal surfaces in front of the display, with the display vertical, the touch screen must generally be operated substantially vertically in concert with the display, which is not convenient for many people and is ill suited for group use around a table. While a horizontal touch screen can in theory be provided, such are rare due to the bulk of the CRT display commonly used. And, if achieved with an LCD or Plasma display screen, they would be expensive today.

Finally, each of the above is typically at most two-dimensional (except when touch screens are constructed for example as disclosed in U.S. Pat. No. 6,008,000 by one of the inventors). The X-Y position on the display monitor screen provides the input command, whether selected by a mouse, key strokes, or a touch icon. The invention herein can be proportional to data in one or more other dimensions as well, as will be explained.

Finally, at least one other disadvantage of the prior art exists, namely that the monitor of the computer needs to be used for input, and cannot, at least in its entirety, simultaneously be used for display, such as video, animations or the like. If one can afford two monitors, this is a solution, but at a cost in both dollars and space. Even with today's favorable monitor prices, the invention herein is still at least $150 cheaper than a two monitor plus keyboard/mouse solution, and at least $500 cheaper than a touch screen plus monitor solution (the closest analog).

To use a monitor for less than its entirety (e.g. sharing its display surface with input command data and output display), is confusing and limiting for many applications.

To recap then, today's mouse and keyboard devices require considerable training and physical coordination, and are thus not suited to small children and infants, or the very old. Touch screens as pointed out are expensive, sometimes awkward to use, and often lack resolution. And they are not horizontal. One example of horizontal play made possible with the invention, is for infants who can crawl or sit on a playpen or crib floor. Not only is it easier for them to play using the invention, but it is easier for their mothers to aid their play.

In regard to the book embodiments of the invention, somewhat competing "Electronic books" are described in U.S. patents such as U.S. Pat. No. 6,144,380 "Method of entering and using handwriting to identify locations within an electronic book"

Other types of electronic books with various signaling devices on a page are described in U.S. Pat. No. 6,124,851 "Electronic book with multiple page displays"

U.S. Pat. No. 6,041,215 "Method for making an electronic book for producing audible sounds in response to visual indicia"

While the taking of a video image of a person, for incorporating into a book cover is disclosed in U.S. Pat. No. 5,782,598 by Salzberger, the use of cameras to actually view and produce a digital image of a conventional printed book (or other printed page matter) itself is not disclosed anywhere we can find.

A related aspect of the invention concerns programming methods and media. When most people today wish to input programmed sets of commands to a computer, they load a program using magnetic (e.g. Floppy disc) or digital optical media (e.g. CD Rom), Alternatively, the internet is becoming a medium for program download from remote data sources.

Years ago, these devices were not generally available. Programs were often typed in on keyboard terminals, or somewhat later, inputted to computers on Punched cards, derived from the Hollerith sorting cards developed in the 1930's approximately. Such punched cards used holes punched in cards, which were optically then observed to be on or off (binary 1 or zero) at various locations on the card.

Data was also entered this way, evolving into the famous "Don't fold, spindle, or mutilate" cards so common 30 years ago. This was also an example of user readable printing on the data input media. (e.g. a US Government Check).

The magnetic and digital optical media of today can contain millions of times more data than the cards of yore. But they generally contain little or no printed data to help the user, and often are more difficult to handle. The printed matter only appears on a screen when the magnetic or optical device is read, and the media cannot provide information laying by itself on a table, for example.

One might argue that the internet and fast downloads which are just around the corner technically will obsolete magnetic media anyway. But the invention addresses a different problem. What is needed is something that allows people to better interact with a computer, or the internet, and make use of it. Optical presentation of data (e.g. the printing on the check) capable of visual comprehension is very useful in this regard, as the eyes are the sense most capable of data assimilation.

This invention in one preferred embodiment, employs a programming board, while in another, a printed "card" is as a computer input which can widely distributed, by means familiar to the average person, such as magazines, newspaper, by hand or whatever. Or you can print it yourself on your computer printer for example. And uniquely, this card can be read by electro-optical sensing means (typically a high resolution TV camera) which can see the user touch or otherwise interact with the card, book or other printed matter as well, in common with other aspects of the invention.

In combination with this touch attribute of the invention, we know of nothing in the art relating to coded optical program generation. However, a recently granted U.S. Pat. No. 6,098,882 has some aspects of some of the coding aspects our invention, and is an interesting illustration of the utility of what is proposed. The inventors of U.S. Pat. No. 6,098,882 came from a different direction, and have concentrated on the data coding technique, though a check of their web site (paperdisk.com) does reveal more concentration on applications, though quite different from the ones disclosed herein which are focused more on connection to the actual input of the user.

Other examples of optically readable codes, albeit for other purposes are the new Two Dimensional Data Matrix codes. For example see U.S. Pat. No. 5,742,041 by Liu "Method and apparatus for locating and decoding machine-readable symbols, including data matrix symbols", which describes techniques that could also be used to read a monochrome version of the code on the cards of this invention. The optically readable code data elements herein however, can be arranged in any way desired, and does not have to correspond with any existing convention.

BRIEF SUMMARY OF THE INVENTION

The above goals are achieved by providing, in a preferred embodiment, a member having printing on it. The printing can be words, pictographic characters, pictures, and data codes, for example, and each is disclosed. Objects, such as a persons finger, or a marker, or pen point, placed on the member are viewed by an electro-optical sensor which can be an ordinary TV camera commonly obtainable and connected typically to the computer via the USB or IEEE 1394 ports. Such cameras today cost in the range of $75 and typically provide 640×480 pixel resolution at up to 30 frames per second with at least 256 bit color resolution. Larger, faster cameras can also be obtained. The member is generally viewed in the same field of view used to see the objects thereon The invention can also serve as sort of a physical touch screen-like pad which while not able to display programmed inputs, can none the less be changed and can provide limited graphics and lettering features. By using simple physical devices in this manner, it can provide a considerable improvement on prior art methods of programming computers, in that:

It provides a measure of the directness and simplicity of a touch screen, but at much lower cost It can be operated horizontally with ease, making it easier to be used by the very young, old and groups.

Compared with a touch screen or pad, it is 2½ or 3 dimensional—giving a much larger choice of input combinations. And it has other input "dimensions" as well, such as color or shape—not easy to effect with a typical touch screen The physical and three dimensional nature of the invention also "Feels Natural" and provides a more common human approach to computer use. It makes using computers fun.

The invention also acts as an important teaching aide, especially for small children and the disabled, who have undeveloped motor skills. Such persons can, with the invention, become computer literate far faster than those using conventional input devices such as a mouse In addition, The invention can provide meaningful teaching and other experiences capable of reaching wide audiences at low cost give life to a child's imagination thru the medium of known objects, books, and software, providing unique learning experiences.

provide extremely effective advertising and brand development, via specialized promotions which also draw users to ones web site.

And the invention can use printed matter from any source, such as cards mentioned above as an input device for complete programs including macros of all kinds which are similarly generated. In this case the program commands exist as printed code-on a piece of paper, in one preferred embodiment. The paper can be a newspaper clipping, and the codes can be like data matrix codes or any other code sufficiently capacity to carry the program instructions desired while being accurately read by the TV camera used to digitize the image of the code on the paper or other medium, such as plastic.

Similarly, data can be entered into a computer in a similar manner.

Information useful to humans can also be printed on the paper which carries the program code. Such human readable information can be alphanumeric characters, Chinese characters (and related), pictures, diagrams or the like, as well as purely decorative data such as company logos or scenes.

Visually recognized data of this sort can be used to provide information to a human viewing the program coded paper (which henceforward in this application will be called a "program or data card", or "card" or in some cases "board" Both program and data can be imputed via the card.

The "card" embodiment as disclosed herein, has three unique advantages for use by ordinary people:
1. It is naturally understandable from the card itself, without requiring use with a computer first.
2. It can be distributed in ways familiar to the vast majority of the population, again without using a computer, and,
3. The information on one side, can be used to react to the commands of a user entered from touch points on the other side. This is totally independent of the computer system or its protocol or whatever.

These advantages can be summarized as the ease of comprehension, distribution and touch command input.

In a very important auxiliary version, the human can respond directly to this information, by touching parts of the card. This touch is then registered by the TV camera (or another sensing means) and the appropriate action taken.

Typically it is envisioned that only one card would be used for a given program. However, multiple cards in sequence could be used if desired to input data or programs.

It is noted that common everyday items of commerce or life can be "cards" useful in this invention. One example are business cards (a.k.a. Calling cards)

Finally, in one exemplary embodiment, the invention can also provide a unique reading and learning experience for children and adults alike. A TV Camera is used to observe a conventional or substantially conventional book being read (for example, by a 4 year old) and a computer connected to the camera analyzes indications such as an object or finger positioned by the user, and optionally, voice commands sensed with a microphone. Associated with this input are local or remote means to display or verbalized data and commands, generated by computer programs responsive to the readers input. Distance interaction of readers over the internet is one of the many beneficial and fun results.

It is a goal of the invention to provide a means for simplified computer programming by those with little computer skills.

It is a further goal of the invention to provide means by which simple printed documents, such as newspapers, books, cards and the like can be used to aid entry of programs or data into computers.

It is a goal of the invention to provide simplified means to program or enter data into computers, useful to ordinary citizens with little training.

It is a goal of the invention to provide program and interaction means capable of easy human comprehension using natural skills It is also a goal of the invention to provide simplified means to program or enter data into computers, related to figures or characters. In addition, it is a goal to provide enhanced means for entry of Chinese and other pictographic characters, Kanji etc.

It is a further goal of the invention to make it possible to read handwritten figures or characters, which can be associated with certain program functions and data downloads It is a goal of the invention to provide simple means for people who are not computer literate to achieve the benefits of computerization.

It is a further goal of the invention to provide extremely low cost and highly natural distribution method for programs and humanly understandable instructions therefore.

It is a goal of the invention to provide a simple method to providing a dashboard human interface capable of widespread understanding and use.

It is a further goal of the invention to provide a simple method to providing a tactile feel to a dashboard human interface It is a further goal of the invention to provide a simple method by which a car or other control system computer can be programmed to provide control and communication functions It is a further goal of the invention to provide a means for safe vehicle control and communication while driving It is a further goal of the invention to provide a means for enhanced vehicle interaction with a driver, at lower cost than presently possible.

It is also a goal of the invention to illustrate a new concept of ultra low cost portable program and touch devices which may in addition be viewed as "single use" for example, in a drive to work on a given day.

It is a further goal of the invention to provide a system which combines a conventional LCD or other flat display, with a unique single use program and touch capability (which may be tactile or planar), and to further couple this with voice capability It is a goal of the invention to provide improved learning of reading, spelling and speaking skills It is a goal of the invention to provide improved learning of foreign languages It is a further goal of the invention to provide simplified means to enter data into computers, relating to the reading or observation of printed matter It is a still further goal of the invention to create a new form of business related to the manufacture, distribution and creation of books and other publications suitable for the invention.

It is a goal of the invention to illustrate methods for inputting data at multiple points It is a goal of the invention to provide, at a very affordable cost, a reading experience which has added fun and educational value based on standard printed matter.

These and other attributes of the invention are disclosed in the following embodiments (and where applicable in the co-pending referenced applications as well)

It is a still further goal of the invention to create a new form of business related to the manufacture, distribution and creation of cards of the invention.

These and other attributes will be disclosed in the following embodiments (and where applicable in the co-pending referenced applications as well)

DESCRIPTION OF FIGURES

FIG. 7 illustrates a pirate ship game whose board is cut out from a preprinted cereal box, with portions of the game also down loaded from the internet. Also illustrated are the local or remote display and audio possibilities inherent in the invention

DETAILED DESCRIPTION OF THE INVENTION

FIG. 1

Figure 1A:
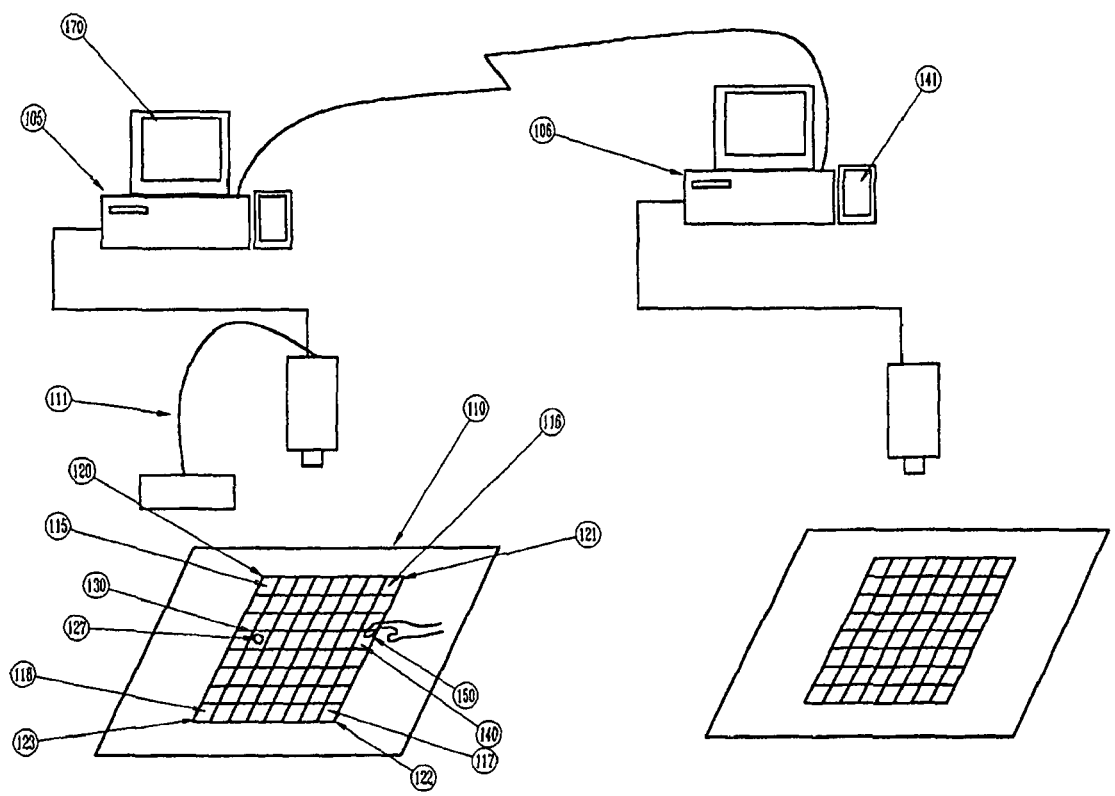
FIG. 1 illustrates a programming board of the invention, employing simple color distinction.

FIG. 1 illustrates a programming board member of the invention, employing simple color distinction. As shown a checkerboard like board 101, (which in this case is shown for simplicity as a 4×4 matrix rather than a 8×8 matrix of a conventional checker or chess board, which it also might be) is viewed by a color TV camera 102, connected via a USB link to computer 105. The board is typically flat on a table 110 as shown, with the camera looking downward—in this case thanks to a gooseneck mount 111 connected to computer 105.

The four squares in the corners of the board, 115-118 are viewed by the camera, and their locations are used to calibrate the field of view (FOV) of the camera, which is larger than the extent of the board in each direction x and y as shown. Alternatively the 4 board corners 120-123 may be used In the simplest arrangement, the board squares are of contrasting colors which may be easily distinguished by software of the computer 105 when analyzing the RGB or other color indicative output of the camera. In this case let us assume the squares are red and white.

In order to create a program command, let us say to play the "Ride of the Valkeries" by Richard Wagner using a stored wave file in the memory of computer 105 or in a remote computer such as 106 connected (dotted lines) over the internet or whatever, the particular software in the computer 105 is programmed to recognize the placement of a marker 127 of known color (say blue) and size on square 130. The marker is shown of round form but it could be another shape. And indeed as will be discussed later, the shape (and other characteristics) can connote meaning as well, if such added complication is desired.

When the user then places such a round blue marker 127 on square 130 then, the camera senses this condition and the computer compares this to a table of actions. In this case, upon detecting a blue marker on 130, the computer processing the camera image calls up wave file representing "Ride of the Valkeries". This can be transmitted as well to remote sites via the internet. Only the code corresponding to the action is needed to be transmitted, since the wave file can reside at the remote site, for example on computer 140 having speaker 141. Alternatively the whole song can be transmitted, but this uses more bandwidth—which may be better employed for more dynamic actions needed in a game or whatever.

The TV camera can also advantageously display on display 170 the board image and any tokens or other objects on it (and human hands and fingers if desired, see below and our referenced applications). The display can be in real time or from memory.

Illustrated as well in this figure is another aspect of the invention, the use of ones finger to designate a square (or other location) and the ability to determine as well the height of the finger (or other object) off the board Consider user's finger 150 which is laid on the board 101 over a portion of square 140 so as to indicate the same as the placement of the colored marker. In a teach step the persons finger color can be taught to the computer system which subsequently recognizes same. The computer can process the gray level image using known techniques, for example blob and other algorithms packaged with the Matrox brand "Genesis" image processing board for the PC, and determine the pointing direction of the finger. Or the shape of the finger can be noted, and its tip location found, which covers a certain portion of the square desired. The direction of finger pointing can also indicate which user touched it (whose finger approached from one side or another), much as different colored pieces are assigned to different players in a checkers game. A pen or pencil for example rather than ones finger can also be similarly used (providing more of a color choice as well)

A unique aspect as well of the invention is that the height of the finger or pen above the board can also be sensed and used to denote information. For example in an inexpensive simple height sensing mode illustrated in FIG. 1b, the height H above the board is roughly sensed by turning on illumination light 165 (e.g. an LED cluster) which points at an angle Theta to the viewing direction of camera 102. In this manner a shadow 170 is cast by another players finger 172 (coming in from the opposite side from user 150 as discussed) and the lateral position P in the boards x direction of the shadow 170 on the board gives the finger height by triangulation. Note the stand-off distance, s, of the camera to the board is typically much larger than implied in FIG. 1b (which has been compressed to save drawing space)

In certain cases, the angle incident light can always be on, if the shadow cast is of a unique color detectable under all conditions experienced.

One can thus signal an analog value of a variable by ones height off the board, while indicating a program call with the square indicated in x and y with the light source 165 turned off.

It should be noted while this drawing and others in this disclosure typically portray the invention as using a board the size of a table top or fraction thereof, there is no real limit big or small to the size, which is determined only by the camera lens chosen. If too small, its clear that it defeats the "human" and natural aspect of the invention. But of some interest is that it can be large—for example easily the size of a card table top, or even the size of a small rug. This is very hard, if not impossible, with conventional input devices, particularly those which might be used in the home.

Thus the playing or programming surface can take on a new dimension. The rug example could be a rug with the pattern of the programming in its surface. Similarly a table cloth, or a tarpaulin. Indeed as a outdoor game, or family room game, a hop scotch board, with its naturally occurring squares can be used. In this case ones whole body, rather than a finger would be the programming or play input. Similarly one can slide curling stones onto ice shuffleboards in this way, and of course regular shuffleboard can provide the basis as well.

A dance game can be constructed this way, by moving from square to square in known region with the best steps in location and timing winning the contest. And so forth Note that the programming board can itself be in the format of a QUERTY keyboard if desired, whose keys are sequentially "touched" by a users finger in a hunt and peck fashion, with each location sensed by the camera as before. It is also possible to see all the fingers of ones two hands using the camera as well, and from analysis thereof infer which part of the board, and in this case letter is being touched.

If color alone is insufficient to unambiguously define the object, added algorithms may be employed which are themselves known in the art (many of which are commonly packaged with image analysis frame grabber boards such as the Matrox Genesis. The processes can include for example A brightness detection step relative to surroundings, or to immediate surroundings (contrast)

a shape detection step, in which a search for an object shape is made, such as a circle, ring, triangle, etc. Or a finger.

a color detection step, where a search for a specific color is made, such as a red checker, or flesh colored finger.

a movement step, wherein only target candidates which have moved from a location in a previous TV image are viewed Each step, may process only those passing the previous step, or each may be performed independently, and the results compared later. The orders of these steps can be changed but each adds to further identify the valid indication of the object or finger desired.

FIG. 2

Figure 2:
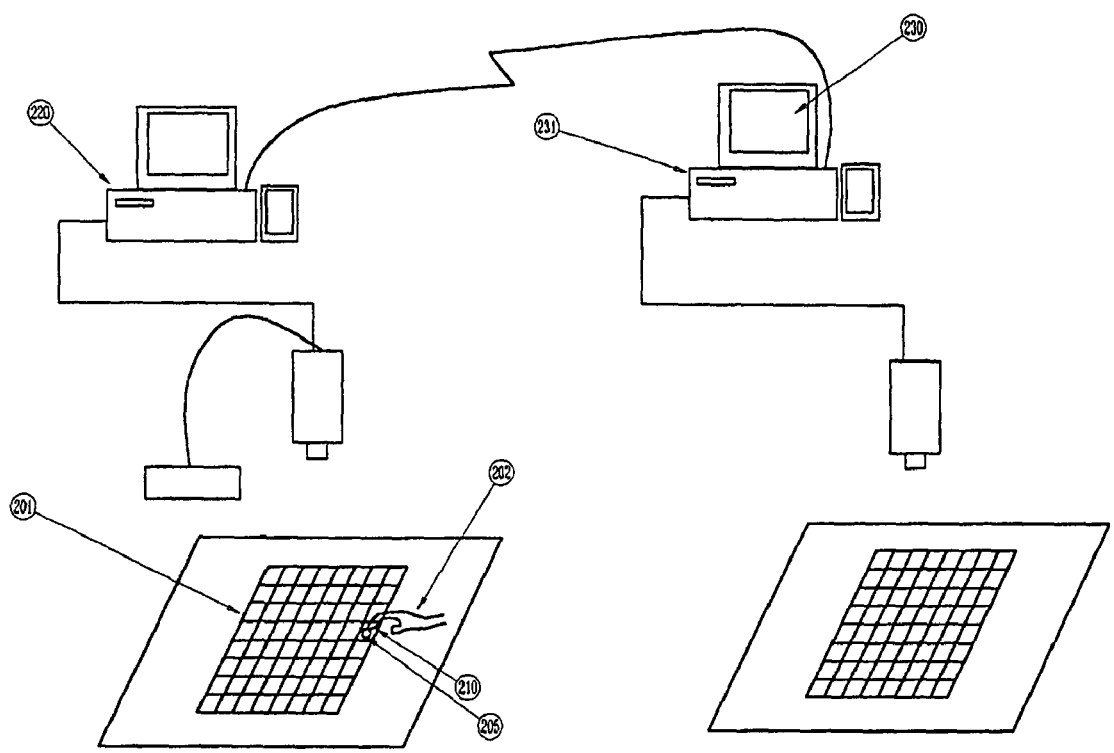
FIG. 2 illustrates a checkerboard game of the invention, in order to create meaningful distance games and other activities within bandwidth limits of the present internet.

FIG. 2 illustrates a checkerboard game of the invention, in order to create meaningful distance games and other activities within bandwidth limits of present internet. The layout and board is similar to FIG. 1 above, but in this case an actual game is played by transmitting such commands. The board member 201 is 8×8 but all detail is not shown. The squares are assumed contrasting, again in this example red and white.

As one player 202 moves his blue colored piece 205 to square 210, the camera and computer combination 220 determines that the square which was originally composed of 100 red pixels, is now composed of only 21 red pixels, surrounding 79 blue pixels. The program then by analyzing the colors and quantities of pixels, can then determine that a blue piece thus now occupies square 210. This data can be transmitted to remote computer 230 which has display screen 231 on which the checker board is also displayed.

The player at the other end has a similar board and makes his moves to counter those of player 202. in this particular instance, the opposing players moves are displayed on the screen, but so can your moves as well. Thus one can play the game from the screen, or from the board, but the later only in part—unless one mirrors the moves displayed on the screen by placing corresponding physical objects on the real board It is possible to play other board games this way as well—chess, for example. It is only necessary to track the moves in the computer program. It is basically a matter of determining that if the player is no longer present on a square, it was captured by a player of another color who is now on the square in question.

FIG. 3

As pointed out in the checkers or chess game example above, the game can be played by using computer software to track the movement of the pieces from their initial known positions (common to all chess boards—checkers the same). But one can also sense the pieces from other characteristics in order to identify their positions and moves.

One way to do this is from individual markings that can be sensed by the camera system. For example a cross 300 on the hat 301 of the bishop 302 on chess board 303, can be sensed by camera 310. Computer 320 can be used to analyze the image of the bishops hat region, and discern the presence (or absence in the case of another man) of the cross using known image processing methods. Indeed the cross color can be coded to indicate whose man it is (or more likely, the rest of the man would be that color) Other men of the chess board would have other code markings visible to the camera. Pawns might have no marking, or a marking of their own.

Other ways of discerning pieces can be used, including the use of shape of the piece as a whole. For example consider the object 350 on "square" 355 of triangular segment type board 360, which has in this case been substituted for chessboard 303 in order to undertake a new game or programming experience. The object is of round shape, which can be analyzed by known methods and the object found using image morphology or the like. It is then distinguished from rectangular piece 365 on triangular "square" 366

The color of the piece can also be different, as can other parameters. Thus on any one square, 9 different possibilities could be present, if there were 3 colors and 3 shapes of objects to be placed.

FIG. 4

Figure 4:
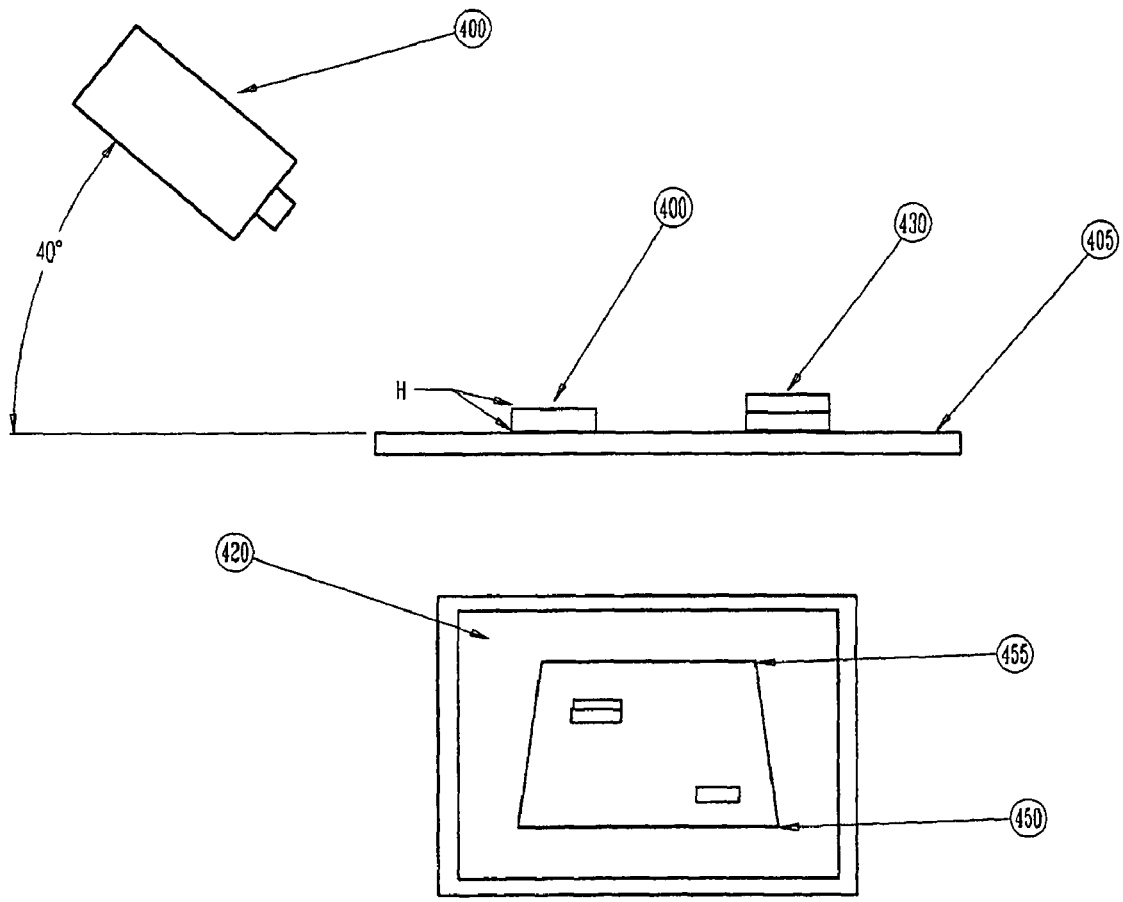
FIG. 4 illustrates added determination by subtended area, shape or height

It is also possible to identify the piece in FIG. 2 from its appearance in the third, or "Z" dimension away from the plane of the board. When the camera is located at an angle to the plane of the board, this can be advantageously done by observation of a objects height or from its subtended area and the added amount of pixels of a given color which are represented For example consider FIG. 4, which illustrates a camera of the invention 400 observing board 405 from an angle theta with respect to the plane of the board. Even with angles of 40 degrees, for example, it is generally possible to see all the pieces on the board without obscuration, while still maintaining an ability to discern height related data.

As shown the height, h, of a single red checker 415, subtends 5 red data pixels in the image field 420 of camera 400, where as a red king 430 (one checker on top of another) subtends 10. (10 is equal to 2hk where k is a constant dependent on the camera geometry and the angle of view). This difference can be used to tell kings from normal pieces. One can also just count the area of lit red data pixels, which area varies with height alone (as all the checkers are of constant diameter).

As before the field of view is calibrated, to also account for differences from one end 450 to another 455 which can result in foreshortening effects due to magnification variances.

Figure 5:
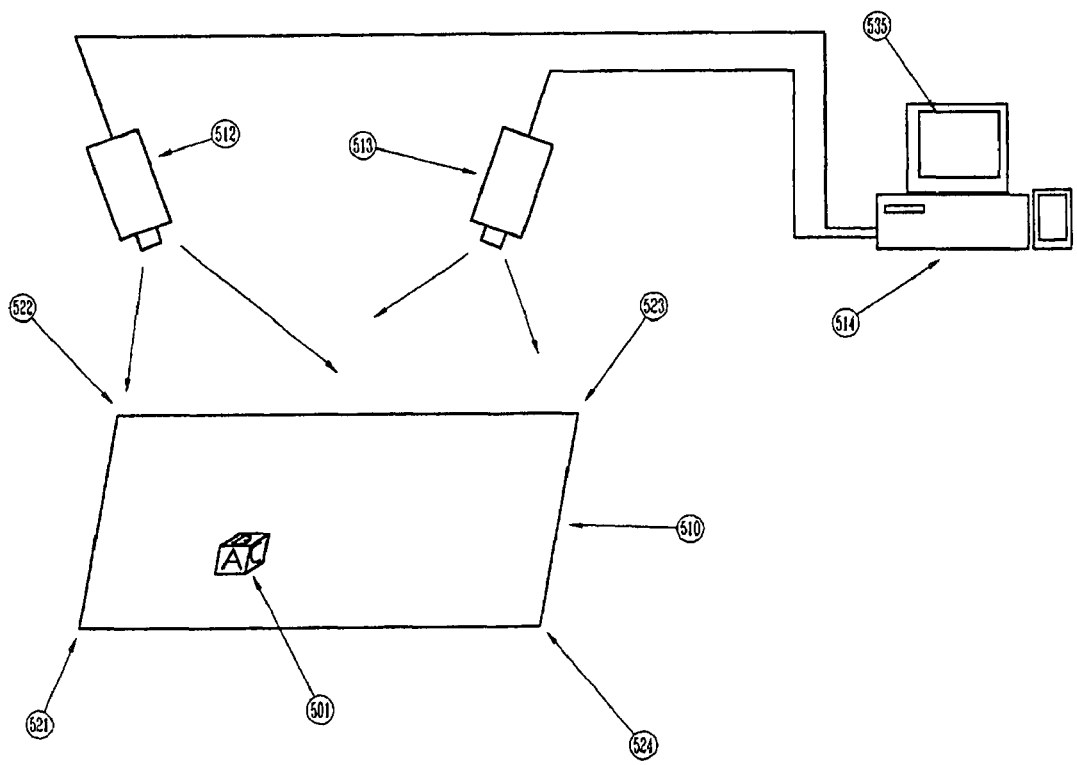
FIG. 5 illustrates the use of two camera stereo to determine more information concerning objects used, especially In three dimensions, such as in a toy block game or programming system

The above figures have illustrated the use of among other things, 2D shape or pointing direction to distinguish objects or identify potential designated squares. 3D shape can also be used to distinguish, as disclosed in the following figure.
FIG. 5

FIG. 5 illustrates the use of two camera stereo to determine more information of the piece, especially in three dimensions such as in a toy block game or programming system.

Consider a block 501, of the classical type with letters of the alphabet on their 6 sides. It is placed on board 510 and viewed in this case by two cameras 512 and 513 processed by computer 514 are used to image the block 501 on board 510, and any other blocks or other objects which might be placed thereon.

Since the cameras form a binocular pair, the 3-D shape of the block can be determined, including its height extension off the board, as well as any of the alphabet letters on its faces (at least those which may be observed by the cameras)

Numerous other camera arrangements, processing, computation, and other issues are discussed in general relative to accurate determination of object positions using two or more camera stereo vision systems in the S. F. El Hakim paper referenced in our co-pending application and the additional references referred to therein.

The computer 514 can also acquire the stereo image of the board and its four corners, 521-524. Solution of the photogrammetric equations allows the position of the paper in space relative to the cameras to be determined, and thence the position of the block to the paper, which is passed to display means 535 or another computer program. With stereo viewing, the board position and angle in 6 degrees of freedom can be continually determined, even if it moved around, for example as it might be on a laptop.

The cameras in this example are mounted overhead. If mounted to the side or front, or at an angle such as 45 degrees to the desktop, the z axis becomes the direction outward from the cameras.

This data is calculated in computer 514, and used to modify a display on a monitor screen or transmit data as desired.

In one embodiment a Matrox "Genesis" frame processor card on an IBM 600 mhz Pentium III PC was used to read both cameras, and process the information as to block type and location 5 times per second.

Typically the cameras 512 and 513 have magnifications and fields of view which are equal, and overlap in the volume of measurement desired. The axes of the cameras can be parallel, but for operation at ranges of a few meters or less, are often inclined at an acute angle A with respect to each other, so as to increase the overlap of their field of view—particularly if larger baseline distances d are used for increased accuracy (albeit with less z range capability).

A large number of different objects can be distinguished in this manner, in addition or instead of by their color.
FIG. 6

Figure 6A:
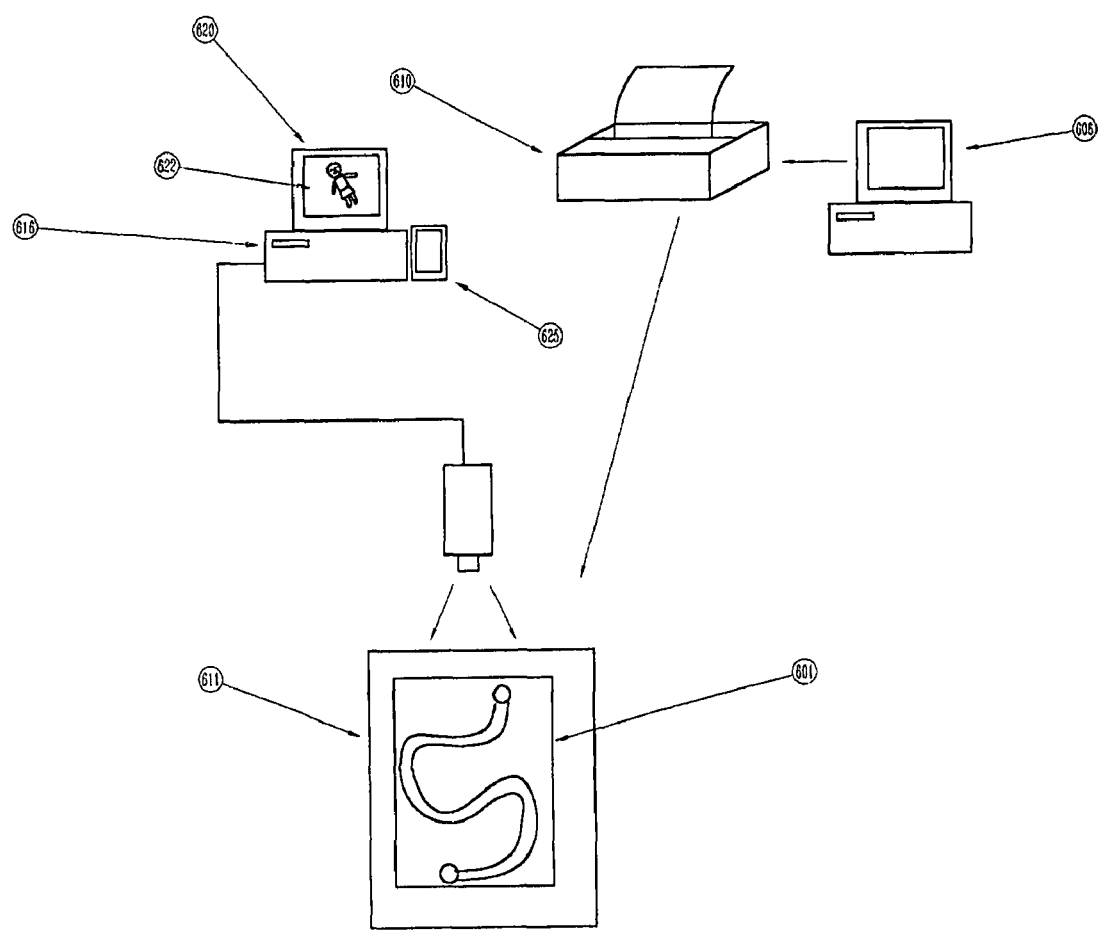
FIG. 6 illustrates several exemplary game/activity boards of the invention which may downloaded from the internet site, and pasted up at home
- a game for infants, which teaches geometric shape and color
- a monopoly or other classical board game
- a doll house game for young girls

FIG. 6a illustrates an alternate programming board embodiment of the invention. In this case, the design of board 601 is downloaded from internet website source 606 and printed out on local printer 610, for example in ones home. The download can be provided for example for free as a promotional activity by a company, as can the software to work the game, providing sounds and animations to display on the screens of one or more users. Certain promotional information can also be displayed, if free say.

Each game user (or their parent) prints out the board design 601 on his printer, and then typically pastes it to a backing material (e.g. cardboard) 611. This board, as before, is observed by camera 615 connected to computer 616 equipped with suitable image analysis software. The design of the group of pieces 618 is also printed out and pasted in such a manner as well.

The first illustrated board, 601 is in the shape of game for use by very small children. The game in its simplest form, might just entail moving a colored geometric piece to the arm say of a crude doll picture formed of geometric shapes, plain or colored. When the computer program (downloaded, or provided on storage media say) determines the correct piece is in place, it plays a wave file which says "ARM"—or whatever As the child places for example, a yellow arm piece on the yellow arm outline on the board the camera for example senses that the number of yellow pixels did not significantly decrease—in this case indicating yellow on yellow. Or it could desired to look for a blue piece on a yellow arm of the board. Or it could be a plain white outline of an arm on the board, on which a blue arm piece goes. Or whatever.

The resulting data is then displayed on the computer screen 620, which in this case might just show the build up 622 of the doll (in this case missing a shoe). When the whole thing is finished on the screen the game is over, and in one embodiment, a life size TV display (if a projector exists) of a doll looking like the one just "made" can be presented which can sing a song, say via loudspeaker 625 driven by a prerecorded wave file stored in computer 616.

Several things are noted. First the wave files for sound can be recorded by the user—whether it is the parents or the child himself. This makes the doll "theirs". In the same vein, video or still excerpts can be displayed on a display monitor of the computer or remote computer as a result of actions taken.

In addition, the activity can be played with "N" players, taking their turns over the internet for example, to each add a piece to the doll, with each seeing the display of all players work for example. Hence the name "InfantLink"!

In another embodiment of the invention, the board could be that of a classical board game board, such as monopoly whose various squares which represent real estate properties and so forth can be learned by the camera and computer, or downloaded from a data source.

In the game, one can even compose ones own sound clips for the voice of your player, for example in the "Clue" game (which has rooms for squares) this could be that of "Col.

Mustard". You can create your own images to display as well, or down load suitable ones from DVD, CD-Rom, the internet or other sources. And, using the same TV camera in a set up mode, you can "snap a picture of your face and then using commercially available software, superpose your face on the downloaded images, if desired. The display screen can be any size and in some versions a large and even life-size projection display can be used. This in a clue game, would give a real appearance to the rooms and people! Indeed as you move your mustard piece into the library square, the program can call a video clip of an actor playing Col. Mustard moving into the library—but perhaps with your prerecorded voice overlay. The voice can even be part of the game—you could pre record it to fool people as to your real intentions. Or to give them clues. A whole new kind of game results.

Figure 6B:
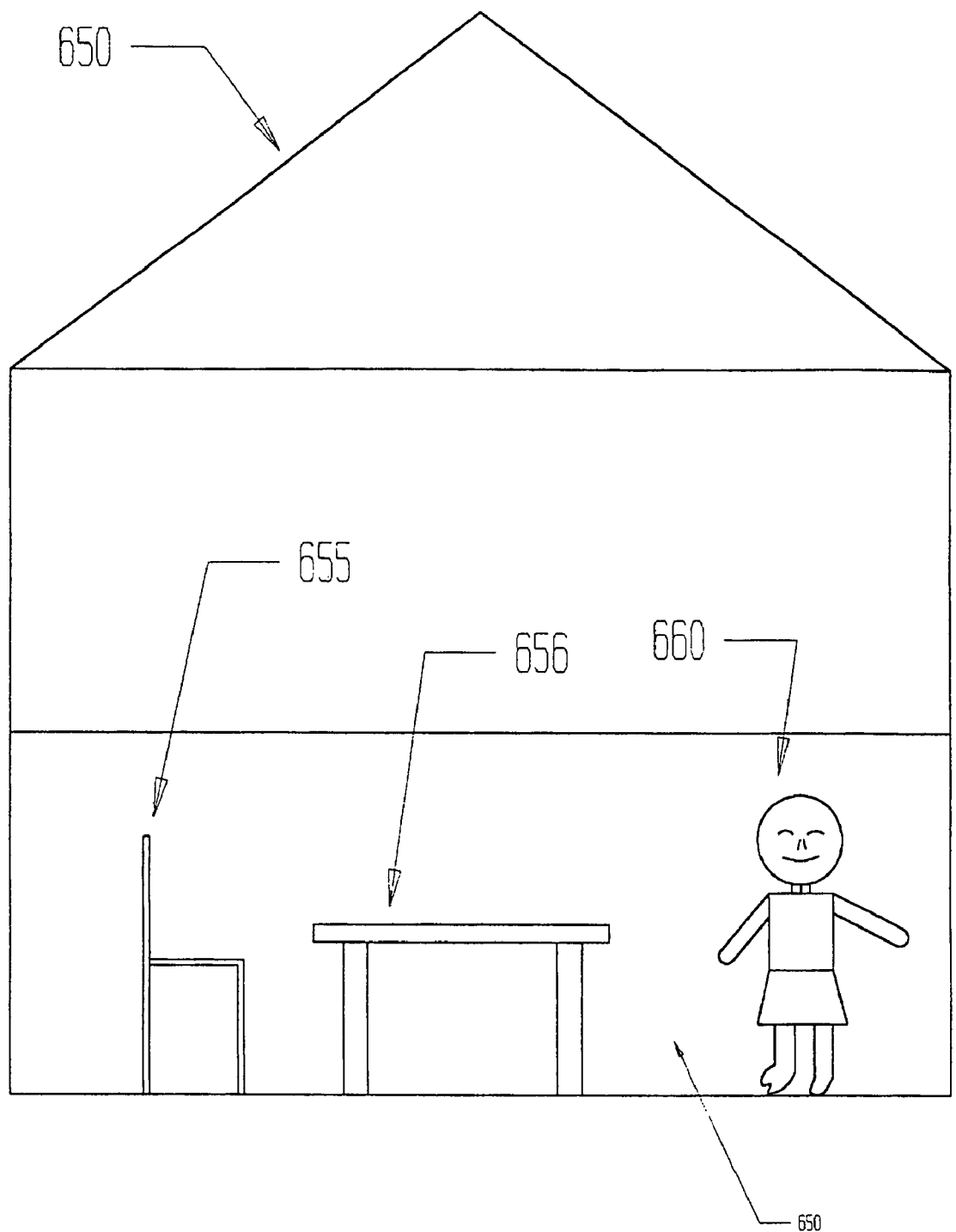

Another game shown in FIG. 6*b* is a doll house game for girls. In this case, the doll house game board 650 (used with apparatus such as that in FIG. 6*a*) has numerous rooms such as living room 651 (just like a clue game board would) and has various pieces of furniture such as chair 655 and table 656 which are placed in the room along with the cut out doll housewife 660, which like the board, has been printed out from a internet based source, and pasted to a backing which has in time honored fashion been cut out to the figure of the doll. The doll could however have been printed out from an image of ones own mother or a distant cousin, emailed in jpeg format to ones printer. And so on. The same holds true with the cousins wave file.

The table, chair and person can all be recognized by their solid color, a pattern of color, their shape, or other means, or a combination thereof.

FIG. 7

FIG. 7 illustrates a pirate ship game board, cut out from a cereal box, with portions also down loaded from the internet. Also illustrated are the local or remote display and audio possibilities inherent in the invention in which the players can optionally store their own sound clips or use pre-made clips in order to give life to movements of their characters. These characters can be simple pieces such as standup cutout 700 on a pirate ship board such as 701 such as one might download as per FIG. 6 above, or they can be a more elaborate plastic models which could be purchased at a toy store.

In this example a movement of a piece 700 to location segment or "Square" 705 causes a command to be transmitted by computer 710 connected to camera 715 via "surge-link" a system 720 which can be transmitted to a remote location such as display 725 over the internet 726 or other means in order to call up graphics, video clips, sounds or whatever.

As another example, the game board is printed by a cereal manufacturer on the back of a cereal box. The child cuts out the game board from the back of the box, as well as the colored pieces, (which alternatively for example could be plastic or cardboard and included in the box like toys). The child then downloads the game software including special pirate ship graphics, buried treasure video, and the like from the cereal manufacturers website. Or the requisite data could be included in the cereal box, on low cost storage media such as mini-CDs The deck of the ship need not be divided into squares known to the user, but can be so known to the camera system whose computer software can set up the coordinate grid of the game by detecting the location and orientation of the ship 701. This can work even if the ship is rotated in the roll direction around the z axis normal to the board (typically substantially parallel to the camera optical axis), and using software such as the Cognex Corp. PATMAX program, the rotation can be substantial.

As one example, when character 740 is moved out the plank 741 to "walk the plank" the program calls up a voice, and then a recorded splash for example. On a display screen an image of a pirate ship, and person going into the water can be displayed. This could be "Captain Hook" of the well known Disney Peter Pan story.

A microphone 755 can be used to input voice commands into the computer 710 which can then using known technology (Dragon software, IBM via voice, etc) be used to process the command. This voice data input can be used in conjunction with determination of the location of pieces place by the user, or fingers of the user for example The above is a powerful promotional method for cereal purchase, with the web site causing an added repeat desire for the next game.

FIG. 8

Figure 8:
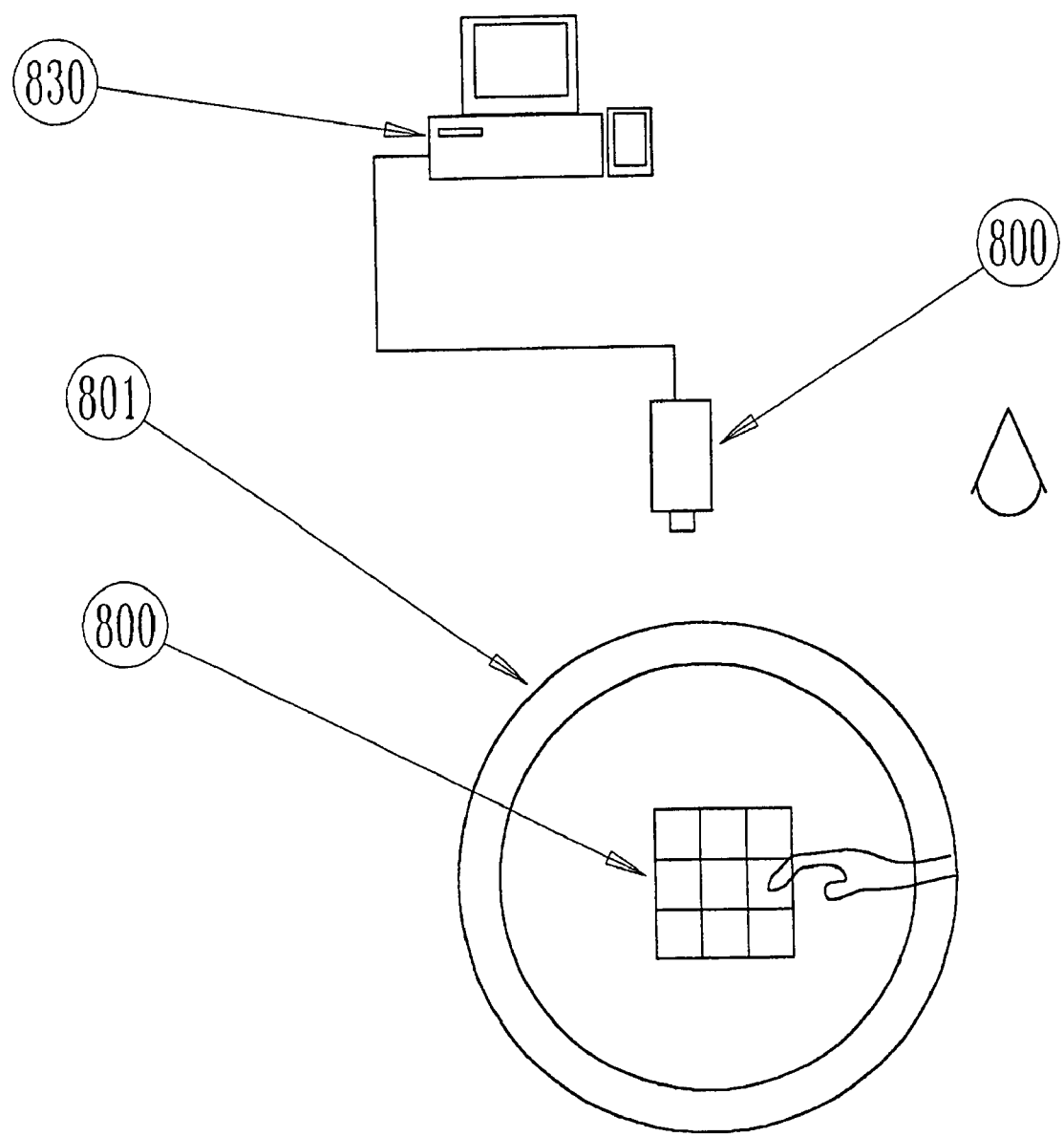
FIG. 8 illustrates an embodiment in an automobile steering wheel

FIG. 8 illustrates the use of the invention in a car, as an alternative to a touch pad. More particularly, the "board" 800 is in the center the steering wheel 801 of the car, right over the top of the airbag and viewed by camera 805 in the roof.

This arrangement has many of the advantages already discussed, plus the fact that a conventional touch pad is difficult to co-locate with the airbag In this example, the programming or data entry element is ideally ones finger, such as 815 of the driver, who may place it on any one of the perhaps 8 squares such as 820 in the wheel surface (for example printed on the plastic airbag cover). These squares can have symbols, lettering or both. Or they can just be the symbols or lettering themselves without the squares, since the position of the points on the surface of the airbag cover are easily calibrated to the camera.

This is a low cost way to create inputs in a prime piece of car interior "real estate" so to speak, directly in front of, and in reach of, the driver. And it doesn't require wires thru the wheel which could be twisted around.

When the wheel is turned past a given point where image alignment becomes difficult, it is possible that one might wish to disable the system (since the commands in question would be likely be ones you might do at leisure when going straight down the road anyway, such as radio volume or heat). The computer 830 analyzing the camera output can however adjust the image for small rotations (e.g. +/−20 degrees) of the wheel from straight ahead—the complexity also depending on just what markings are to be detected.

When operation at night is desired, a small visible, or IR source 840 in the headliner 841 of the vehicle can be used to illuminate the wheel markings. The IR source (e.g. an IR LED group) is nice because it is non obtrusive in that it cant be seen. If some kind of marking illumination using backlit luminescent things could be provided, this would be no problem, but the cost and complexity go up

FIG. 9

Of late there has been a great deal of discussion regarding "electronic books". But much less attention has been paid to what electronics, so to speak, can do to enhance the reading and educational experience of conventional books, or other printed matter. Not only can this make the reading of a conventional book more interesting, but there are many beneficial educational aspects as well.

In addition, a conventional book has a big advantage over electronic books. It is portable, it is low cost, and the pages are permanent. It has many useful features, in that the book can be carried in its natural form anywhere, (e.g. to school), but later read in its electronically enhanced form of the invention. The permanent nature also acts as a form of redundancy, in case of computer malfunction.

It should also be noted that for large segments of the population, a conventional book is more natural, and easier to read, than an electronic one. Thus enhancement of the experiences of a conventional book or publication is easier to accept for many people. And the incremental hardware price of such enhancement using the invention is nearly nil, as the cameras connected to home computers are becoming prevalent, with promotional prices for the cameras reaching as low as $9 today. 60 million of such cameras are expected to be in use in the USA alone by 2005. And even the cheapest of these can be useful in practicing the invention.

Disclosed above is a board or similar programming or data entry device viewed by an ordinary TV camera commonly obtainable and connected typically to a home computer via the USB or IEEE 1394 ports. As disclosed above, such a board serves as a physical touch screen-like pad and an extension of this concept to the reading of books and other printed matter such as newspapers, magazines and the like is now disclosed. The goal is to assist the reader in some way, either to provide enhanced enjoyment, improved learning, or quicker access to related data.

This embodiment of the invention uses a TV camera to view for example a page of a book, such as a children's reader. The reader then can point or otherwise designate something on the page in a manner which is sensed by the Camera and the image analyzed by a computer program to determine the intent of the reader. This may also be assisted by a voice recognition program in the computer to analyze voice commands.

The computer then can direct any or all of a variety of actions to occur, for example;

Talking back to the reader via a computer generated speech program

Providing an appropriate visual display on a monitor for the user

Directing a light beam or other indicator to point at something on the page

Communicating the users signal to a remote data source

Figure 9:
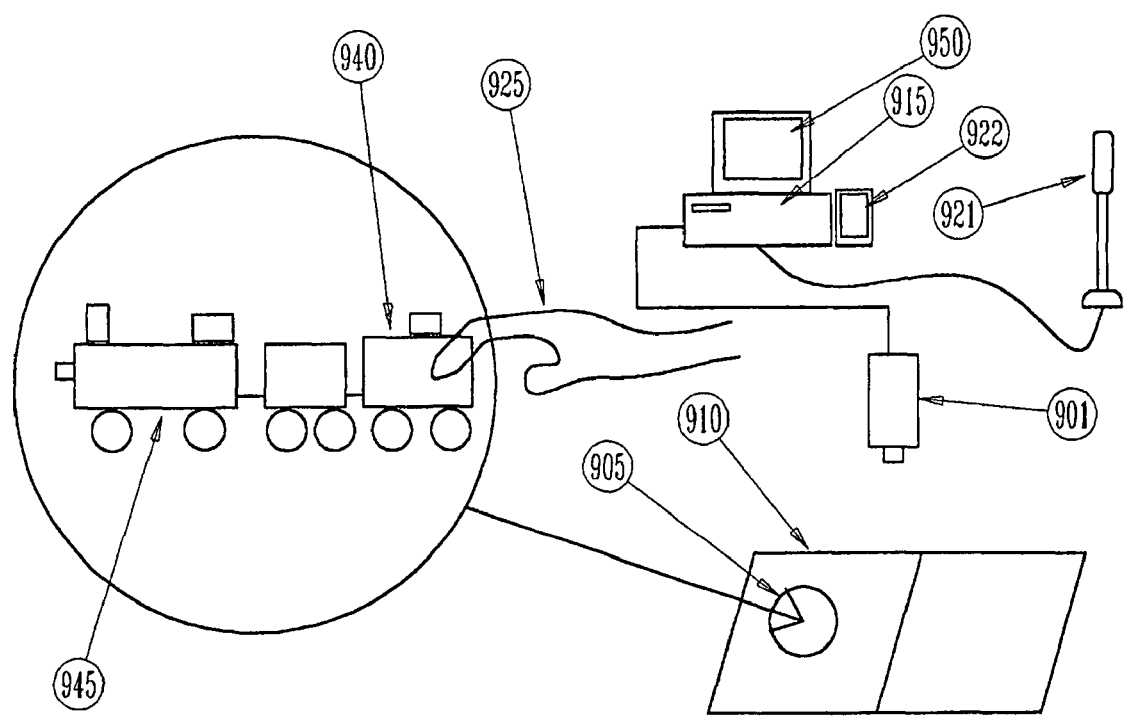
FIG. 9 illustrates a children's book embodiment of the invention

Communicating the users signal to a remote reader, for shared experiences over the internet, say Storing data of the reader for later analysis as to learning attributes for example Providing data of the reader for analysis and assistance by a remote teacher or assistant FIG. 9 illustrates a children's book embodiment of the invention. A TV camera 901 to view for example a page 905 of a book 906, such as a children's reader. The user then can point or otherwise designate something on the page in a manner which is sensed by the camera. Such designation can be by covering an area with ones finger or an object such as a pencil or coin, pointing at a region with ones finger or a crayon, or any other suitable means which may be sensed by the camera. The image obtained is then analyzed by a computer program in computer 115 to determine the intent of the reader. This may also be assisted by a voice recognition program in the computer to analyze voice commands.

For example, consider child 920 who is undertaking a reading session. The child might first (and optionally, assuming the computer is equipped with a workable voice recognition program such as IBM ViaVoice, operating with microphone 921) be asked a question by the computer program, through loudspeaker 922 such as:

What is your name?
　Reply: Joey
What book are you reading?
　Reply: *The Little Engine that Could*

At this point, the computer having if necessary determined the content of the page and book from a data base 935, and interrogated the image digitized from camera 901 to determine, using the data base, the page to which the child has the book open to. Alternatively the program can ask the child to start at the beginning for example, or to say the page he or she is on.

The data base can be composed of the normal data on the pages and/or optional data put there for recognition purposes, even to include small codes such as dot matrix codes 936 or bar codes known in the art.

With suitable encoding or data bases the use of voice recognition to identify the book being read from a spoken word is rendered unnecessary, assuming the data base information is available to the computer program, as it would be if the book supplier had such data available on his internet site connected to said computer, or had it encoded even in the book itself, for example using the method of our co-pending applications. It could also be on a small low cost CD Rom distributed with the book—which has the advantage that auxiliary images and sounds to be used with the book can be stored locally rather than fetched for example from other sources.

The computer can then ask the child for example,

Can you touch the caboose?

At this point the child in this one example, uses his finger 925 to touch caboose 940 of train 945 illustrated on book page 905.

Alternatively, the computer can ask the child to point at the yellow object, for example. As he touches the caboose, which is yellow, a suitable positive reinforcement can be made such as a loudspeaker spoken "Good Going Joey", or some such. A somewhat older reader, In addition, might be asked to say what it is (e.g. Caboose). The correctness of the response can be determined via the camera in the first case, and via voice recognition in the second. And the data can be communicated to remote locations or used to create added reading value.

The computer then can direct any or all of a variety of actions to occur, for example Talking back to the reader via a computer generated speech program, as pointed out above.

Providing an appropriate visual display, such as 950, for the user, This could be a displayed video clip of the brakeman in the caboose coming out of his caboose and saying "hi I'm Benny the brakeman", for example.

Communicating the users signal or other data concerning the reading session to a remote data source, such as the web site of the book publisher.

Communicating the users signal to a remote reader, for shared experiences over the internet, for example as discussed further in FIG. 2

Storing data of the reader for later analysis as to learning attributes for example, with storage being either local or at a remote site where analysis tools might be more readily available (again for example, the book publisher site—which is logical given that the data base of the book itself likely resides there.)

Providing data of the reader for analysis and assistance by a remote teacher or assistant Directing a light beam or other indicator to point at something on the page, using for example a programmable laser beam generator 155 with two axis galvanometer scanner 156 such as available from General Scanning company, which can for example be used to direct the child to identify an object pointed out.

Clearly any number of questions can be asked of the child, and numerous things can be done as a result. Alternatively, the computer program, a remote educator, or an internet connected friend can ask the question.

The results can also be due to an action of the child independent of a question. For example the child might decide just to cause his train to go over the hill on the page, by tracing the progress of the train along the track over the top of the hill printed on the page with his finger, whose movement and/or path is sensed in turn by the TV camera and computer. This then can engage another line of action (for example cheering by the animals displayed on the monitor 150 as the train makes it to the other side), or a move to the next page.

In more sophisticated cases, the computer can ask the child to read words out loud, and listen for their accuracy, or transmit them to other users or educators. "Dick and Jane" for example. And this can be done in other languages too. The person can be asked to say the same thing in another language, or the other language version of the book page can be displayed on the TV display.

While often useful, it should be noted that the invention does not require voice recognition to operate in the more elementary examples. In addition, such recognition may be difficult with soft spoken children in noisy environments for example. And some kids may be able to read before they can talk, or at least talk well.

The invention comprehends analysis of vocabulary words in conjunction with the data base of the book to make it easier to understand the reader. For example, when it is determined that the reader is reading a certain book, or even more particularly a given page of same, there is only a limited vocabulary really required to interact. For example, train cars, engines, terrain, and animals (and perhaps other words) in the case of "The Little Engine that Could". This means that a much more specific voice processing can be employed, such as provided by Fonix corporation for example.

Without voice recognition, the program can tell the child to start reading on page 1, or at the beginning and cue him to turn the page when the program thought it useful.

Or the child could turn the page on his own, and the program sense that he had done this (via the tv camera) and respond accordingly. For example Hey Johnny, are you through with page 3 yet? What happened to the Giraffe?

At that point an image of a sad Giraffe left behind at the station could be shown at the display. And maybe the train could back up to get him.

To see the users finger, a simple template corresponding to finger shape can be used by the image processor to determine the location of the end of the finger (finger tip) and the pointing direction of the finger on the page, if desired. The pointing direction allows determination of what the reader is desirous of indicating even if he is not very precise in his movements (also of aid to handicapped persons).

In another application, the reader says a word of something seen on the page, e.g. Caboose a voice recognition program in computer 915 recognizes this, and displays relevant caboose images on a display. If the person points at the caboose as well, the location of the caboose can be identified by the computer from the tv image—even if no data base of the book is known, or any shape (e.g. caboose shape) recognition software is used. It is noted that the use of the Computer to identify an object, for example the caboose, is aided if one knows a priori that cabooses are present.

As noted, generally a Touch of an object on a page, or near an object, is generally used to trigger action, and there is a whole data base as well of actions which could be triggered. For example, touch locomotive, sound chug-chug, or if whistle, woo-woo or trigger speech; to a user, to a remote friend, etc (e.g. where the locomotive or teacher talks to the reader), for example to tell a story.

One can designate set of objects, not just one (e.g. train cars) by running ones finger over the object in sequence, rather than leaving it static. The time on an object can be used to control what is designated. Alternatively, a voice command can trigger the designation, for example.

FIG. 10

Figure 10:
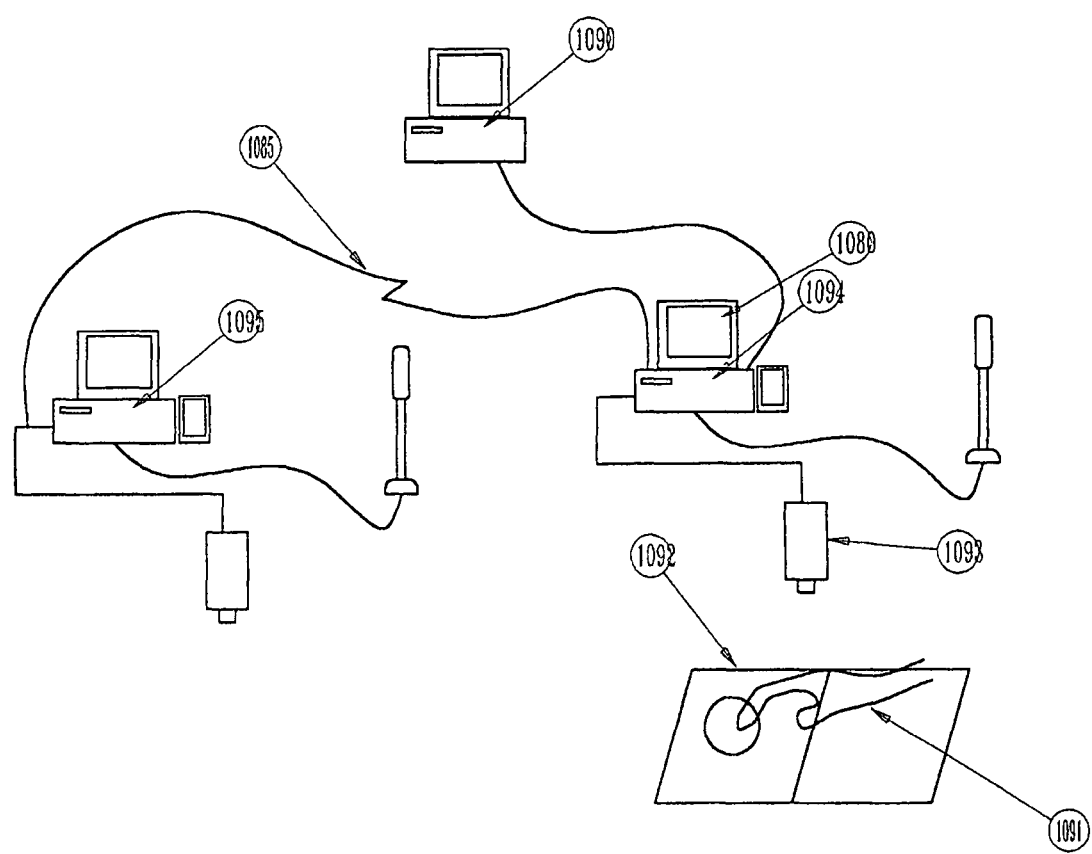
FIG. 10 illustrates another children's book embodiment of the invention

FIG. 10 illustrates a method for sharing learning and other reading experiences through connection of systems of the invention over the internet, or otherwise. At least one second system is interactively connected with a first.

In the simplest case, consider display 1080 (and optionally loudspeakers and microphone not shown), connected over communication link 1085 to output 1070 of computer 1015. In this case a remote party, can see a display which is a function of the reader of FIG. 1. This can be useful in analyzing activity of the reader, for example by a teacher, who can send back by verbal or other commands appropriate cues or the like to the reader.

In a second example, the reader can Interact thru a web site such as 1090 also located remotely. As one possibility, an Auto dial up of an internet site corresponding to an object designated by a reader on the page of book can be accomplished. For example, a site devoted to Locomotives. Or a reading site, with other books on trains.

It is also possible to interact with a similar system. For example, reader 1091 can Doing something on his book 1092, which via tv camera 1093 and computer 1094 causes something to happen with a friend 1095 and his system. Each can designate something on a book in front of them, and interact in this manner or via voice.

FIG. 11

Figure 11:
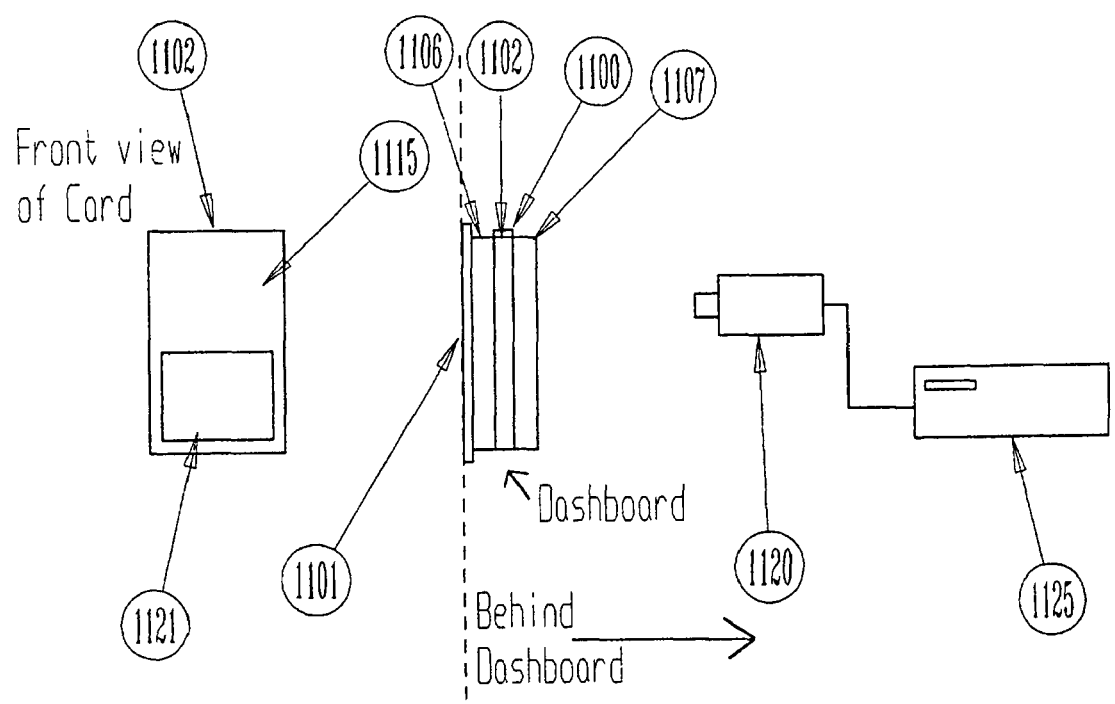
FIG. 11 illustrates a vehicle instrumentation and control example

FIG. 11 illustrates a programming "card" type embodiment of the invention, in an automobile dashboard application, somewhat like the TV camera readable "board" of FIG. 8, located in the steering wheel.

As shown, a slot 1100 in the dash 1101 accepts a card of the invention, 102. The card herein is composed of a piece 1105 clipped from a newspaper, in this case sandwiched between plastic protective sheets 1106 and 1107. In this case sheet 106 facing inward is clear, while sheet 1107 facing the passengers of the vehicle is colored to match the dash décor.

Information on the newsprint portion of the card 1115 is read by TV camera 1120 located in the dash proper (as opposed to overhead, as in FIG. 8), disposed to image the coded printed information 1121. Computer 1125 containing suitable image processing computer boards such as the "Genesis" of Matrox Corporation, Montreal Quebec, digitizes the information and reads it into memory. The data in question is extracted and used to control subsequent functions. These functions can include for example, Read from internal data storage in the vehicle Access and read from internet sources Execute a program carried on the card Execute a program stored elsewhere which is called using data on the card A theoretical capacity of the card is related to the camera and lens system used. If the camera 1120 has 1 million pixels, it is possible to assume that perhaps 200 kb is the maximum data density possible—and this assumes the printing process can provide such. For relatively large cards, e.g. 3×5 inches or larger, this is reasonably possible. For example a laser printer at 600 dpi, can in theory put down 1800×3000 dots on such a card. If 50 dots were allocated per character, this is 55 kb, if half the card area was used for data storage.

FIG. 12

Figure 12:
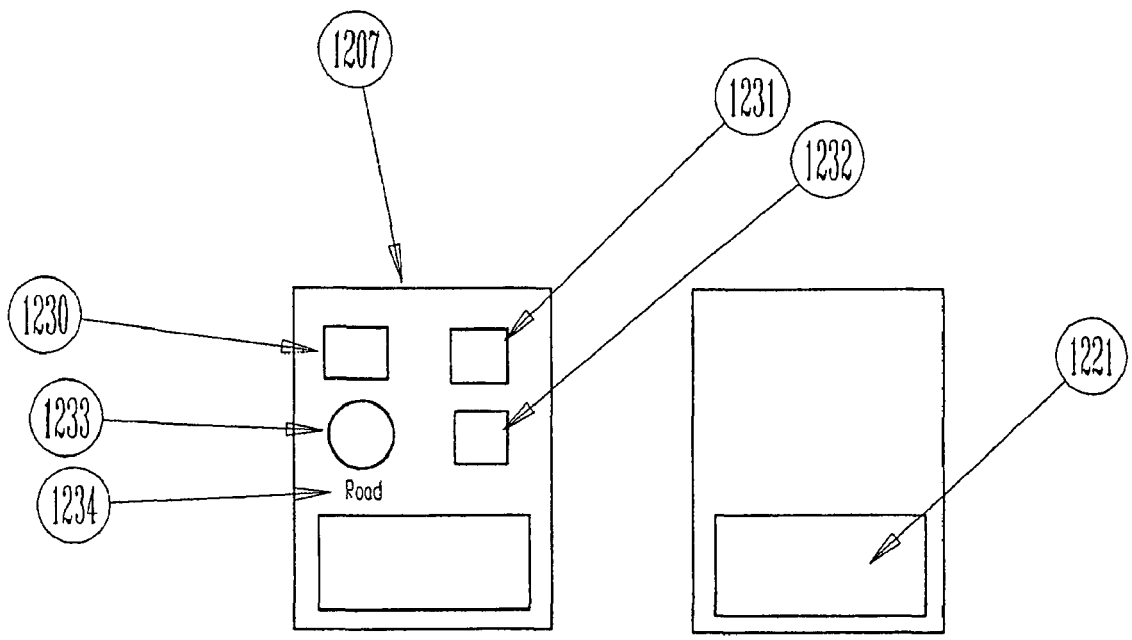
FIG. 12 illustrates a touch version of FIG. 11 similar to FIG. 8

FIG. 12 illustrates a variation on FIG. 11, in which functions are selected by the driver or other user, by touching one of the icons 1230-1233 on the front side of card 1207 facing the driver. In one case herein the icons are printed on the front of card 1207, for example the four icons shown 1230-1233, which in most cases also have printed identification labels associated therewith, such as 1234. In other cases the icons could be printed on the newspaper clipping front side, as part of the same printing process that printed the coded information 1221 on the rear. In this case the printing process can also print designs, graphics and other useful information on the front side as well. For example a map on how to get to a restaurant, which map can be visually observed on the front side by the driver.

When the desired icon is pressed, the required program is called using the data 1221 which has been read on the card by the camera. In one case the program could cause the web site of the restaurant to be accessed via a cellular internet connection, and the be the menu of the restaurant returned and played to the driver, for example via a text to voice program such as that of Lernout and Hauspie. It is noted that the card, while mentioned here as a newspaper ad, could alternatively be the calling card of the restaurant. Or, in another example, it could be printed out by a home computer of a person and distributed.

FIG. 13

Figure 13:
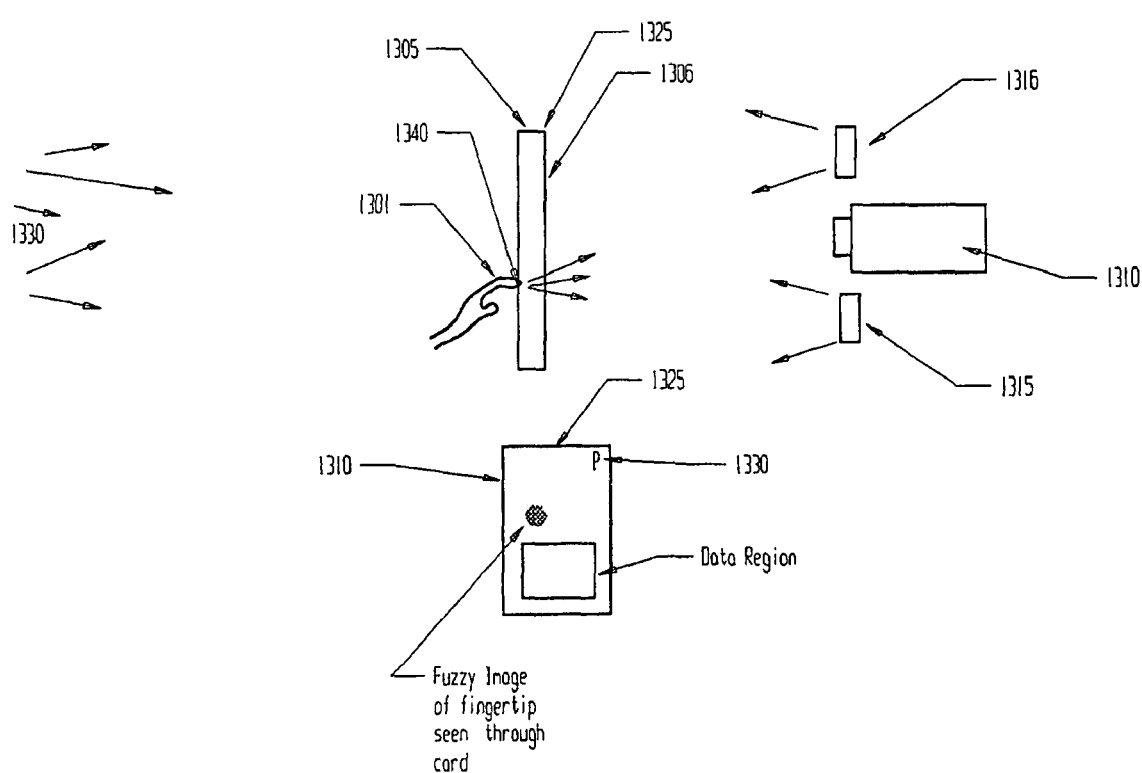
FIG. 13 illustrates sensing of touch from the rear of the card in FIG. 12.

FIG. 13 illustrates sensing of touch. As shown the camera sensing the information stored on the back of the card, can also sense the finger touching the card from the front. In the two examples illustrated in this embodiment, the card is sufficiently light transmissive such that the finger can be viewed directly thru the card by a TV camera behind the card.

In the first case, the finger 1301 is backlit by light 1300 and its shadow is viewed. Consider finger 1301 touching card 1305 whose rear side 1306 viewed by TV Camera 1310. In this case camera 1310 is the same one which views the data on side 1306 facing the camera when illuminated by LED source 1315. When the source 1315 is turned off, the camera views the finger touching the card or near touching condition, due to light 1300 backlighting the card. This backlight is provided by ambient sources or by auxiliary sources not shown.

With only the back light on, the card, if of ordinary paper or newspaper, and thus somewhat light transmissive, appears more or less lit from behind, when the finger is in contact, the shadow image is clearest (most contrast), which condition can be also detected. As scan of the camera image field then can identify the x,y location of the point of touch, 'P' of the finger with respect for example the edge of the card 1325, or any registration points or lines—for example, point 13130 on the card.

In the second case example, an auxiliary light source illuminates the finger 1301 thru the card from the rear. This source may be the same as source 1315, or another source such as 1316. The light passes thru the card, strikes the finger tip 1340, and returns back thru the card to the camera. This works best when the card is thin and thus sufficiently light transmissive. This is aided when the light from 1316 is of a wavelength which can pass easily—for example near infrared at 0.92 microns passes more easily in some plastic materials than does visible light, due to a transmission band in plastic at those wavelengths.

Where preferred wavelengths are used, it may be required to have two sources, or it may still be possible to read finger positions using 315 used to read data on the back of the card, if the data is in a location on the card rear, different in x and y than where the finger touches. (presumably the location in x and y of "touchable" data on the front of the card).

FIG. 14

Figure 14:
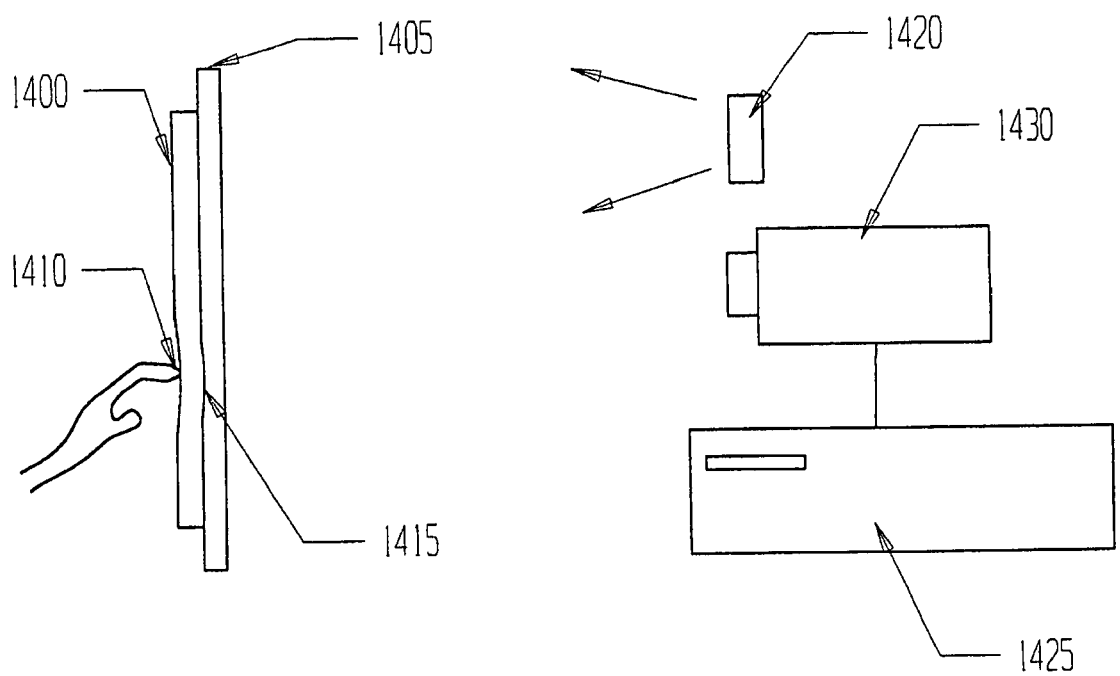
FIG. 14 illustrates alternative touch detection in a FIG. 12 device

FIG. 14 illustrates alternative touch detection in a FIG. 12 type device. In this embodiment, it is accomplished by viewing the change in light reflected from the card when pushed. This is particularly effective for plastic, metal or other cards having good reflectivity.

As shown, card 1400 held by its edges for example in slot 1405 (dotted lines) is pressed by finger 1410 at Point P. The action of pressing causes a local deformation of the card 1415 which causes light from source 1420 to be reflected differently to camera 1430 from the rear of the card. Computer 1425 analyzes camera data and via image subtraction of images spaced in time, can determine the change and its x-y location on the card.

FIG. 15

Figure 15:
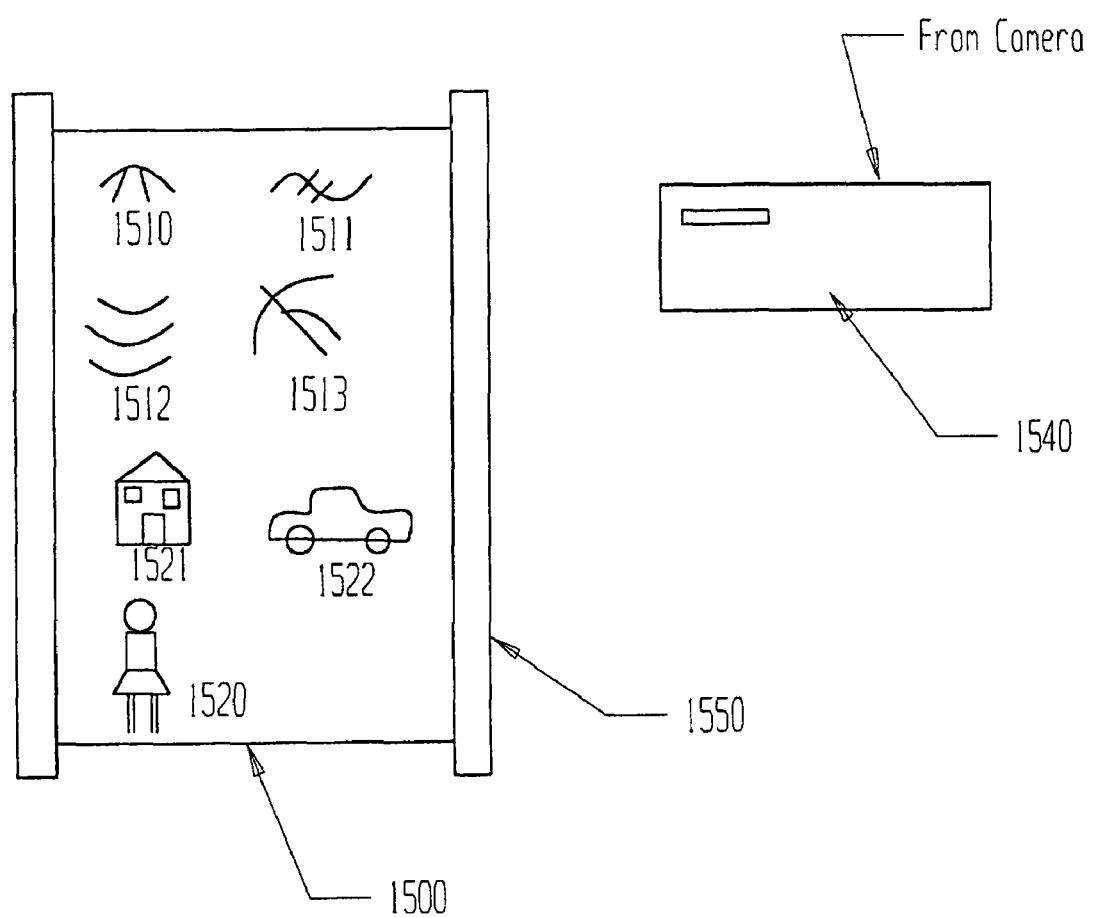
FIG. 15 illustrates a simplified means to program or enter data into computers, related to figures or characters either handwritten or printed.

FIG. 15 illustrates a simplified means to program or enter data into computers, related to figures or characters providing enhanced means for entry of Chinese and other pictographic characters, either handwritten or printed.

For example consider card 1500 having 4 Chinese characters 1510-1513 thereon. These characters mean certain actions in Chinese, and are the equivalent of words or groups of words in English. Similarly figures or pictures 1520 and 1521 also appear on the front of the card, and can be touched when the action or function they signify is desired.

These characters or figures can be hand written or otherwise generated, for example in certain zones of the card in this case indicated by the dotted lines, which are pre known locations to the TV camera (not shown, looking at the rear of the card) used to read the card and touch locations. Program data inserted on the card or otherwise programmed into the computer 1540 connected to the camera, can then relate this data to the card character location, and the function needed.

For example when FIG. 1520 is touched, this tells the computer to do something related to the figure. Lets say the figure was a drawing of Mommy, done by a little girl. Pushing the FIG. 1520 then could use the computer to dialup the girls mother on an intercom or telephone connection. Similarly a Chinese character signifying Heat, could activate a heater, and so forth.

Now one could also write numerous Chinese characters on a card. Consider for example that the computer 1540 had handwriting analysis software loaded in it capable of discerning the characters. Thus placement of the card in the slot 1550 having handwritten characters written on the back of the card would also be a way of entering information into the computer. This would be true of English or other languages as well, though in this case the characters are letters and more of them are needed.

Thus even handwritten letters, figures or characters can be associated with certain program functions and data downloads using the invention. You could therefore make your own touch interface on the spot, assuming the card (or some other media available to the computer) contains the programming data needed to adjust the interface to your newly minted characters or figures. A card of this type could have an interface where a portion of the card was customizable in this way, with the rest generated apriori.

Similarly is also possible to use actual pictures as input, such as photographs of a human face, a dog, a house, or whatever.

FIG. 16

Figure 16:
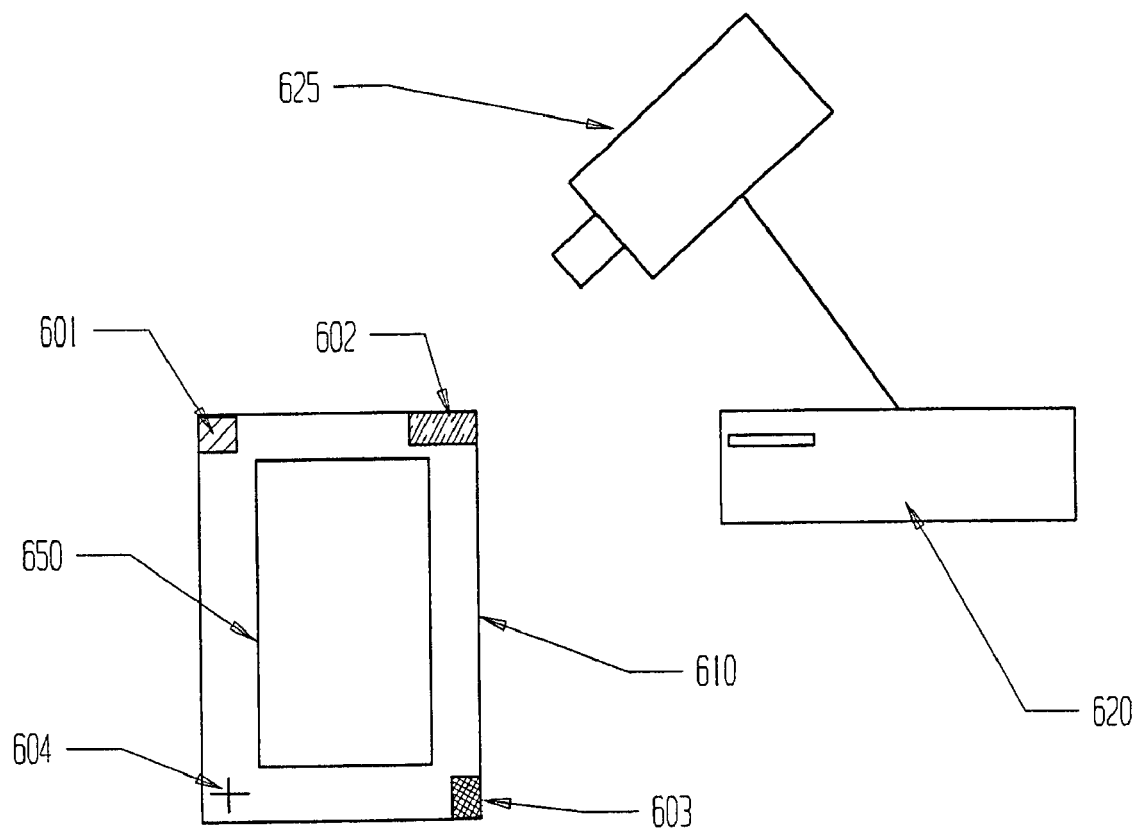
FIG. 16 illustrates a method for color referencing to allow accurate use of high information content cards, in this case from a calling card.

FIG. 16 illustrates a method for color referencing to allow accurate use of color based high information content cards, in this case from a calling card. As shown the four corners 1601-1604 on the back of card 1610 having ones business information on the front are printed in information known to the computer system, in particularly the program resident in computer 1620 which reads out the image of camera 1625 obtained from the back of the card.

In one example, the colors on three of the corners are Red Green and Blue (RGB), with the fourth corner being a control information, not only referencing where the location of the RGB data corner data, and other data encoded is, but also being of a controlled reflectivity if desired. Alternatively, the corner data can be sensed, the relative juxtaposition of RGB determined, and the information encoded found.

In a particular case, the three corners are found to be in units at certain hues, from which other print data on the card is referenced. We have found that by referencing the printing of colors on cards in this manner, and thus calibrating the camera color data, that color resolutions of at least 32 colors can be reliably obtained. This is 7 bit resolution at any one spot on the card.

It is useful to encode in color, as trying to make the printed data bits too small in the data region 1650 of the card (methods for arranging such data are disclosed in the U.S. Pat. No. 6,098,882) runs the risk of difficulty in reading the card if damage occurs thereto, or if alignment errors cannot be sufficiently corrected in the card with respect to the camera axes

FIG. 17

Figure 17:
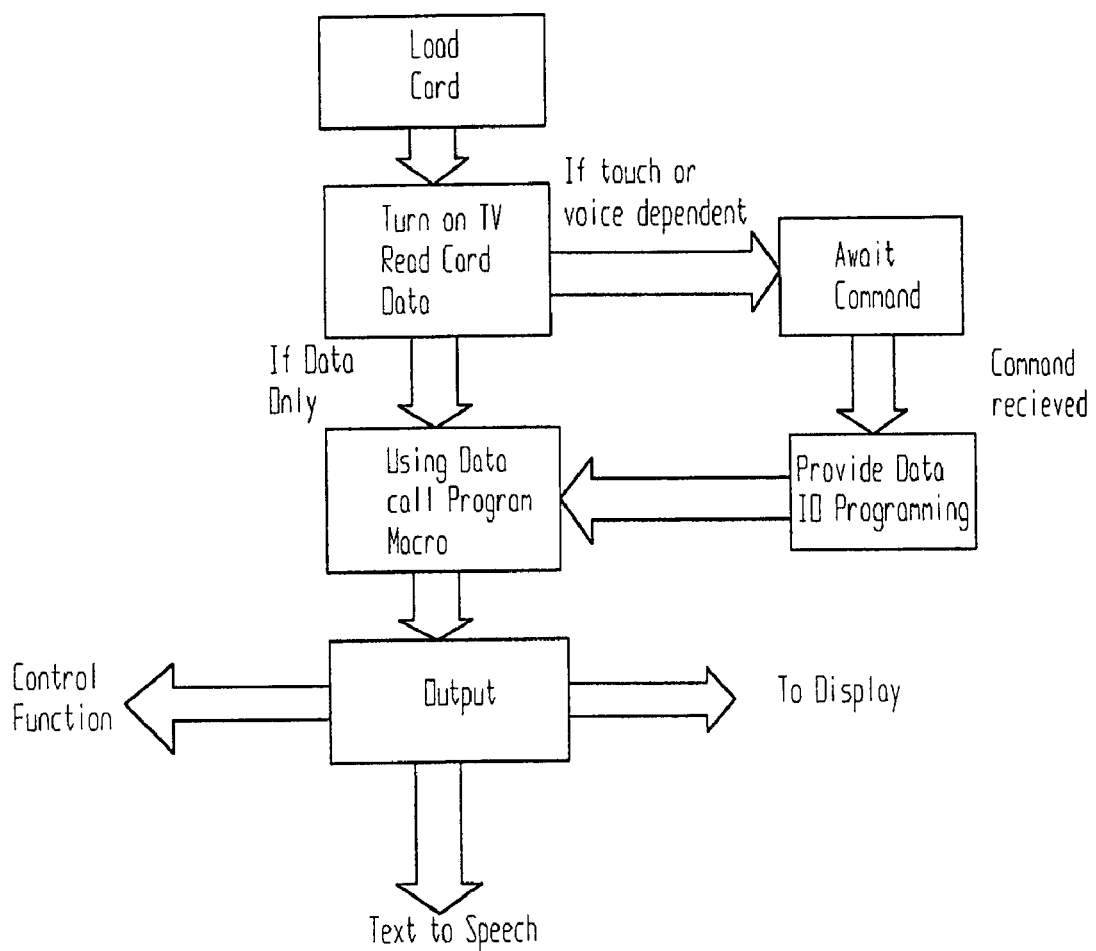
FIG. 17 illustrates a block diagram including steps of load card, read card, call macro, read internet or other data source

FIG. 17 illustrates a block diagram of the card invention employed in a vehicle. The user loads a card 1705 into the slot in the dash. If not already on, the TV camera of the invention is turned on and the card data read 1710. Using the data read, a program macro in the computer is called 1720, which computer then provides an action output 1730. This action can for example be, to display data or other information 1740, to execute a control function 1750 such as a vehicle function, or to call a cellular phone number and read back to the driver (and perhaps display as well) the text of a message 1760.

FIG. 18

Figure 18:
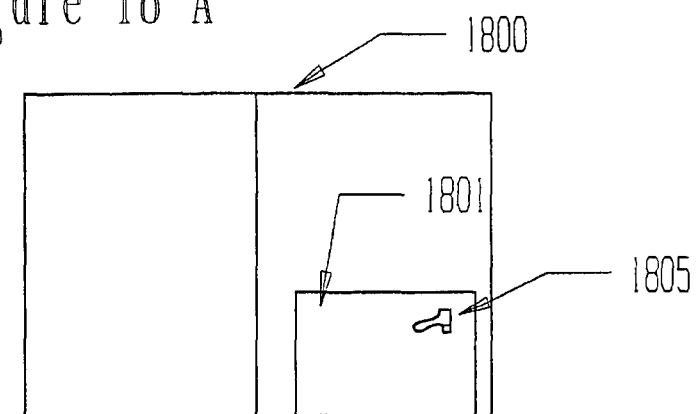
FIG. 18 illustrates a newspaper ad with a program and data card contained therein which is used to program existing control functions of a car dashboard
Figure 18:
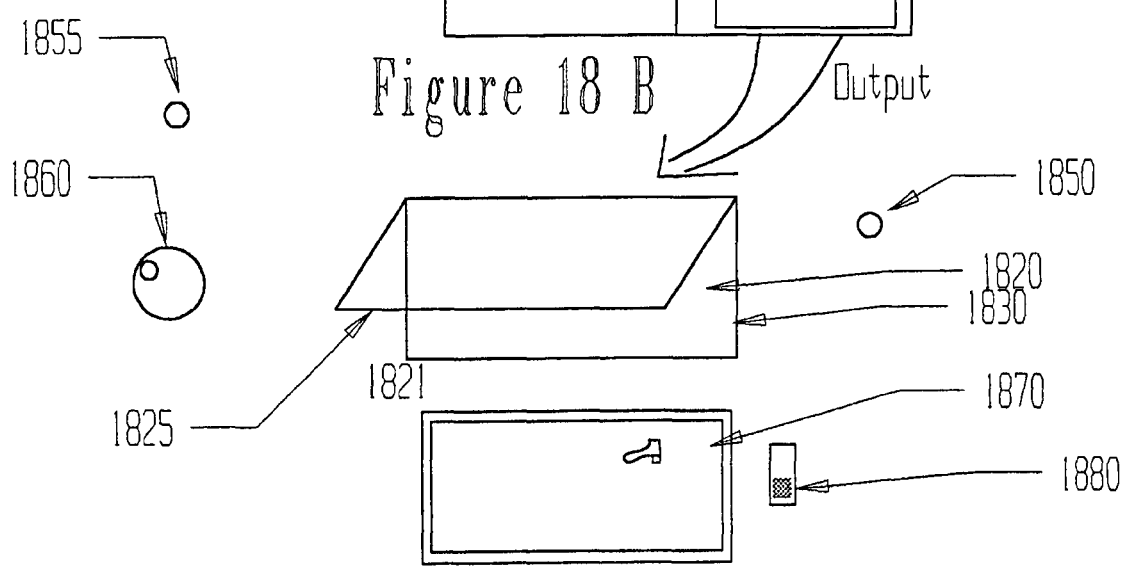

FIG. 18 illustrates a newspaper ad with a program and data card contained therein which is used to program existing control functions of a car dashboard. The user opens up the paper 1800 and sees an ad 1801 for a pair of shoes 1805. The ad says to clip it, and use it in your computer having a card reading apparatus of the invention. The computer in question could be in your home, car or wherever. The paper on the other side is printed with coded data.

An example in a car is here illustrated in FIG. 18b, where the card (in this embodiment being just a piece of newspaper having the ad) in this case placed in the reading area 1820 of the dashboard 1821 using hinged transparent window 1825 which clamps (using clamping/holding means not shown such as a wing nut, magnet or the like) window 1825 down against the card pressing it against window 1830 in the dash, behind which is the TV camera as above used to read the card data into the computer (such as 620 above).

The coded data on the backside of the card facing the camera, when a fixed button 1850 for example on the dash is activated then causes the computer to access a web site over a cellular network connecting the car to the internet, which gives you data concerning the shoes.

And if you hit a button on a touch portion of the card (if of this type), the program queries the net to find (and map display if desired) the nearest store handling this shoe near you, using global positioning data that may also be available to pinpoint the cars location. Otherwise it can be set up to do this from fixed button 1855, say.

The user has thus been saved from dealing with the computer and internet at all. And they can do it in their car, in safety while driving.

Knob 1860 on the dash, when turned according to instructions on the card, steps thru a selection of shoes. Which shoe data can be spoken using text to speech program in the computer, played thru the cars audio system. If an optional LCD display 1870 is present, the shoes can be displayed. If necessary, switch 18180 disables display 1870 when the car is in motion.

It is noted that common everyday items of commerce or life can be "cards" useful in this invention. One good example is business cards (aka Calling cards). In this case the back of the card is printed in color, to illustrate the use of colored cards of the invention.

It is further noted that the data of such printed items can be scanned into a computer and the digitized data file so obtained subsequently transferred by wireless means or otherwise to another computer, such as that in your car. This means that one can off line scan (using for example a HP 3300C Document scanner having 600 dpi resolution) a card of the invention, for example the newspaper clipping just disclosed. This means that the TV camera of the invention such as 1530 need not be used in order to avail oneself of this distribution means, at least if standardized controls are present in the car.

FIG. 19

Figure 19:
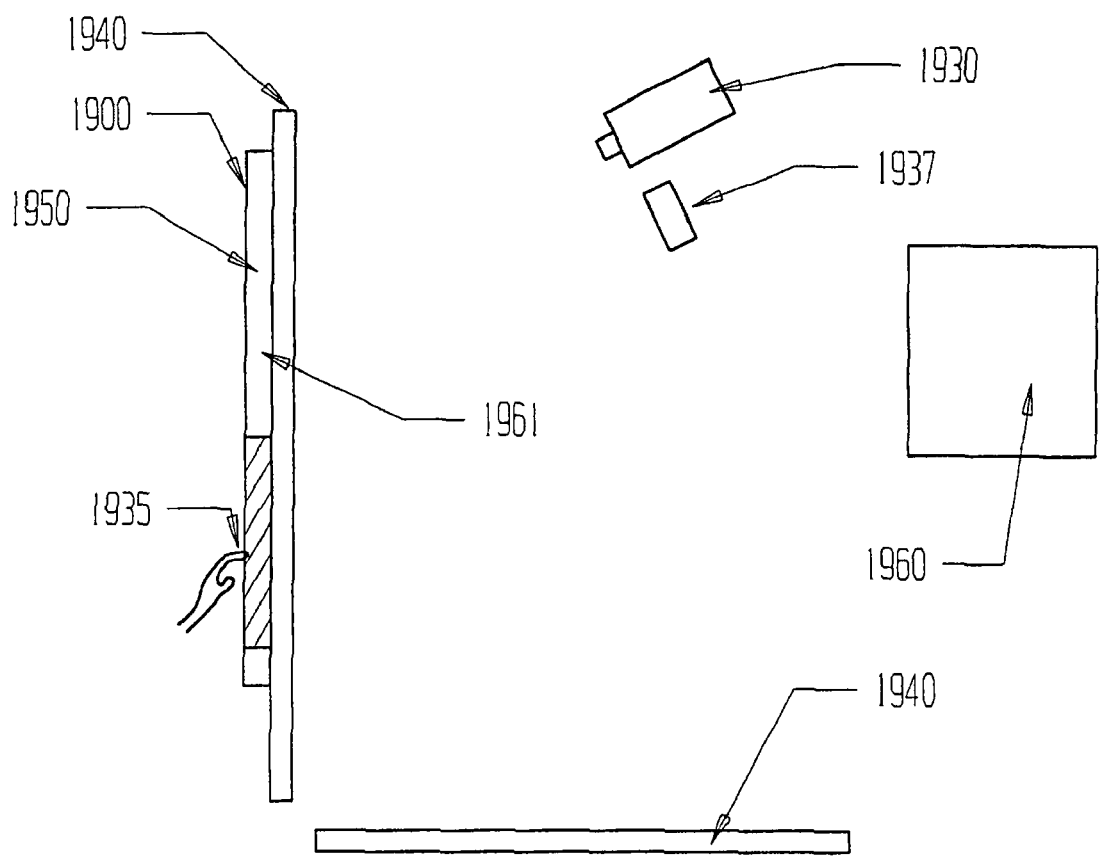
FIG. 19 illustrates a plastic programming card of the invention, included in a cereal box, and used in an automobile. Also illustrated is a means for detection of touch of this card, using the invention of U.S. Pat. No. 6,008,000.

The newspaper clipping example of FIG. 18, could for example be cut out of the back of a box, such as a cereal box. FIG. 19 illustrates a plastic programming card 1900 of the invention, included for example as a prize inside a cereal box, or put in the hands of the user in another way such as via purchase of a stack of varied cards of the invention at a store. or the like. The card in this case is of good quality printing and graphics, and reasonably stiff, which when put in slot of the dashboard 1915 of an automobile, looks, in this example, like it belongs there, so to speak.

Figure 3:
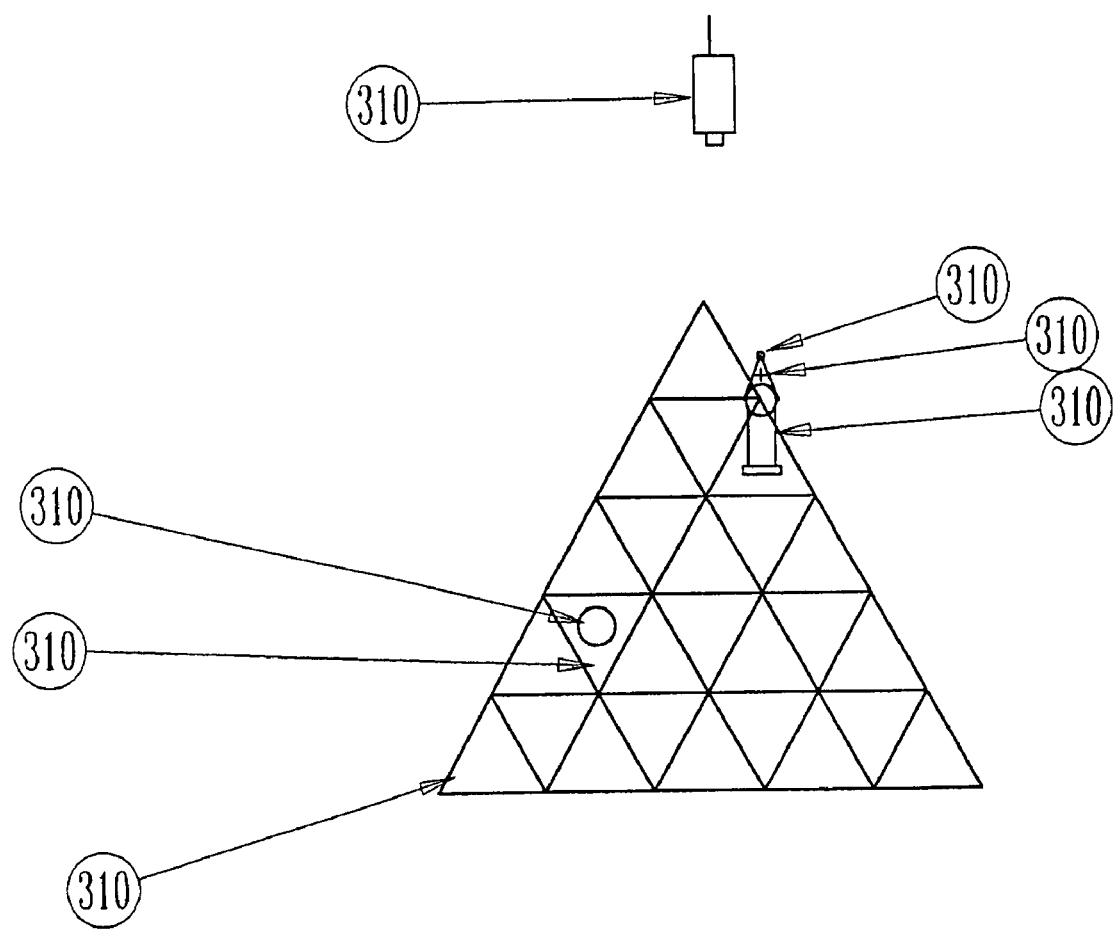
FIG. 3 illustrates added determination using characteristic markings

In this case most of card 1900 is opaque, which makes it difficult to use the techniques of FIG. 3 to see the finger touching the card using a TV camera from the rear as desirable for many applications. Illustrated here is a means for detection of touch of this card, using the invention of U.S. Pat. No. 6,008,000. or another means of detecting the location of touch. In this case detection is made by the deflection of the backing screen 1940 supporting the card 1900 as disclosed in that patent, rather than some light variance caused by deflection of the card itself, as disclosed in FIG. 4 above. In this case TV camera 1930 reads the deflection of the backing screen caused by the touch to the front of the card by finger 1935. This deflection is detected due to differences in light from light source 1937 returning to camera 1930 after re-reflection by retro reflector 1940 (via the "D-Sight Effect). Other means of determining backing screen touch location known in the art can also be used such as surface acoustic waves, or other optical techniques.

This instance also illustrates the use of a visual image projected by a computer controlled rear projection display 1960 onto the card surface 1961 from the rear, in the transparent zone of the plastic card 1950. The opaque data zone and touch zone (which in this embodiment can easily be the same zone of the card), 1951 is viewed by a TV camera not shown (or alternatively camera 1930). This can be used to provide data as well as the interface functions desired

FIG. 20

Figure 20:
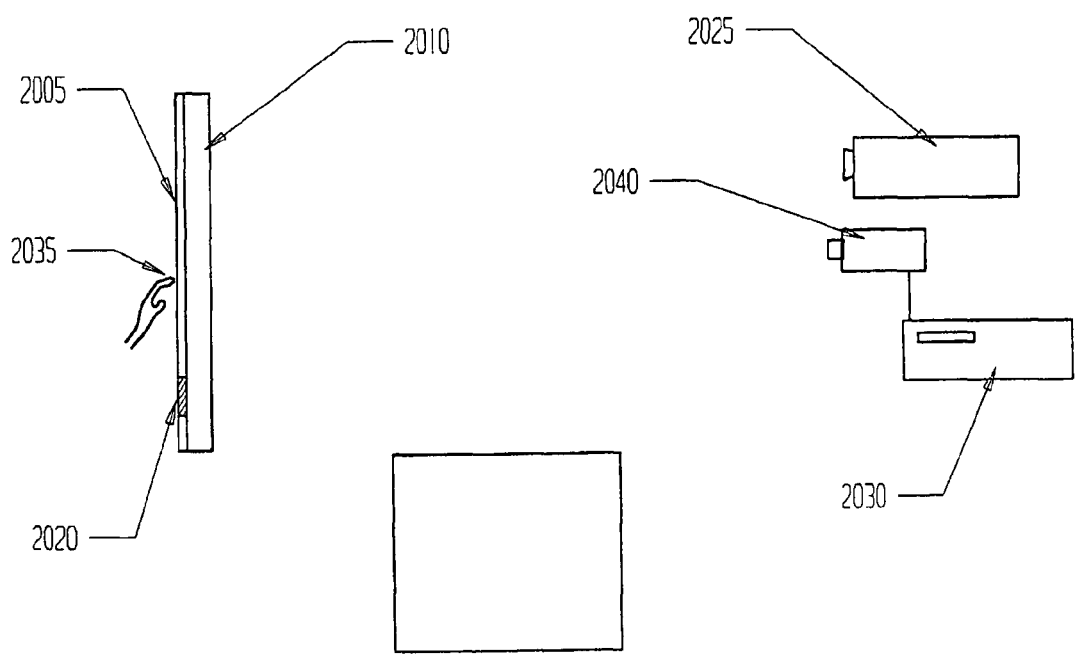
FIG. 20 is an embodiment of the invention using the card of FIG. 19 for use as an overlay to a touch screen.

FIG. 20 is an embodiment of the invention using the card of FIG. 19 as an overlay 2005 to a projection display screen 1010 (which also can function as a touch screen if desired, as disclosed in FIG. 19). In this case the card is transparent (except in zone 1020 where program or data information is stored) such that the lettering graphics and anything else desired is rendered on the card surface 2020 by the image projector 2025 driven by computer 2030. The finger 2035 is seen by the TV camera 2040 thru the display and the card, and its presence detected as desired (and as disclosed above). The card can carry tactile impressions or relief as desired

FIG. 21

Figure 21:
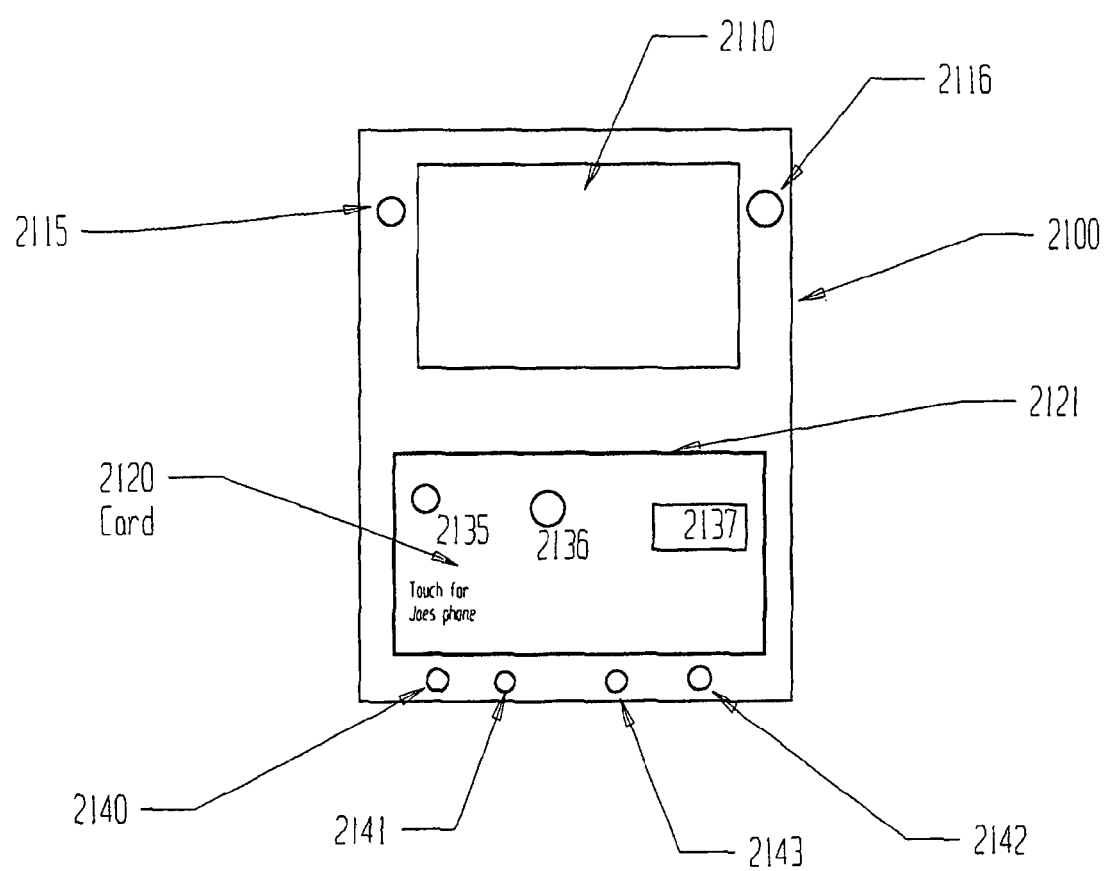
FIG. 21 illustrates an embodiment of the invention used in a car dashboard, in which predefined controls are used in conjunction with a template served by a portion of the card.

FIG. 21 Illustrates a dashboard center stack 2100 equipped with a conventional LCD display 2110 such as commonly used today for navigational displays and two knobs 2115 and 2116 used in conjunction with a card of the invention 2120 underneath, fitting in slot 2121 which contains instructions for use and applicable graphics and control labels, such as label 2125. As before data is desirably inputted to the Car's computer system using optically readable characters on the back of the card, although it is noted that alternative means of data input such as via magnetic media, remote sources connected by wireless, or the like can be used.

In this example, there is no touch screen, but the card contains sufficient information data to input to the control program to use the knobs and buttons and to control using the graphics for the LCD display (also voice in put and output)

While the touch locations could be random and carried with the card such as buttons 2135 and 2136, or slider 2137 as disclosed in the figures above, this figure illustrates an example where the touch buttons are in known standard locations, and indeed the card itself can just be a template referencing buttons in the dash permanently, for example the four buttons 2140 to 2143. Or it could have cutouts in the card to fit over the buttons if desired.

Some sample messages on the card referencing the buttons 2140 to 2143 might be Touch here for Joe's phone (actually shown in the drawing)
Touch here for Pete's phone
Touch here for team soccer scores
Touch here for instructions to team party
Touch here to change knob 1 to music selections
Touch to change knob 2 to weather While the above is quite workable, we feel that as more and more is expected of automotive electronic functions that "real estate" on the dashboard will become ever more precious. For this reason the programmable touch functions where any kind of input arrangement can be present on the card is considered preferable to provision of fixed sets of buttons or other controls, although as shown in FIG. 21, one can have both. In other words the card can have buttons, the next card can be partially clear for a touch screen, and a third can have knobs, and so forth. Some aspects of these more exotic cards are discussed in referenced co-pending applications.

It is also noted that the correlation between fixed controls such as the buttons and knobs above and the card or cards used, can be taught to the system. If you key a certain control on the card, you can then make active an appropriate function. From then on, the card control can be caused to activate the fixed function. For example a certain button on a certain card, could be taught to the cars control system as to activate the radio and tune it to a certain station. A region on the card surface facing the driver near the control could even be blank, to allow one to write in the taught function (e.g. the call letters of the station for example).

The card based aspect of the invention just discussed is fundamentally different in concept to anything which has gone before in two fundamental aspects:

It combines an input function with data or program input information. Thus it acts both as a distributable media, and an interface. No other interface of this type is known. And These unique functions lead to a second unique aspect, namely that it leads to a concept of a "single use" or "mission specific" user interface—totally unknown heretofore. What this means is that a user might only use the data and interface card of the invention one time (though it could be used many). Or in a related manner, he might use it only for a single mission—even if for this mission it was used more than one time.

For example, a single use could be on a particular drive, for example to work one day. The nearest analogy today which comes to mind is if one received in the mail an audio cassette that you played on the way to work and then perhaps disposed of it. (or gave it back to a library, or put it back in a storage area) In this case, the contents of the card provide their own interface to the human, and they act as program calls to remote or on board data sources as needed (e.g. a web site, or sites).

An example of repetitive use, would be to have a card one used every morning on ones drive to work. Perhaps this card would last a few weeks, until the exigencies that were determining ones needs had changed (for example a certain business project had been completed). Each morning you would put this card in (if it already wasn't in) and go thru the steps it contained.

Such a card can be generated by a corporation for its executives, in order that they use the time wisely in the car. Since the touch interface in combination with voice and display as needed, allows this in safety, it is a better solution than each person trying to do on his own. And it can be retrofitted to the vehicle, realizing that all vehicles wont be standardized at once.

If ones goal is to do theoretically at least do anything and everything in ones car on the way to work, then perhaps this invention is too simplistic and some sort of generally programmable (and typically hard to understand and use) device is needed. But if it is just to do some tasks, like those one does every morning—a simple single card does it. And if you want to do something else—you can load another card, which also has the tactile and pictograph data needed for safe operation.

Such a card also might be considered "mission specific" in this context is sort of like a template overlay on a keyboard, used with a particular program. But in this case, it is a touch feeling specific arrangement which might be different for each card. And the card carries the instructions to the computer for its employment.

Note that if one uses something for the first time one doesn't really know from a memory of a previous use, where the touch points are. Desirably then, the dashboard operation devices and controls need to have BIG and CLEAR Letters and Graphics—something sorely lacking in today's dashboards—especially those cluttered with electronics. This situation is optimized as each card is specific to a given mission or task, without needing to be all things at all times.

By having each card contain potentially completely different touch and graphic information, the dash of the car or any other control system can be greatly expanded in its functionality.

Examples of mission specific or single use cards of the invention are:

Mission 1. listen to internet music on way to work. Buttons are for example laid out like a radio of today Distributed by music company to get you to try theirs could be different types of music on buttons Mission 2 Navigate Soccer team to restaurant—give all team members a card with the map, and all cell numbers of other cars, etc.
  Or the card used would be your "regular" soccer team card, general to the needs of soccer team
Mission 3 check emails (and forward if desired to persons noted on the card)
Mission 4 An internet searching touch pad
  A specific one, e.g. Patents, Stocks, Weather, etc
  Use buttons to step thru selections.
    Use a knob or slider to step thru choices, or adjust analog variables
Mission 5 Work on project with team mates (e.g. selling a building contract, with key contacts, websites related to the project, pricing formulas etc all on the card)
Mission 6 General sales mission card expenses, contacts etc.

This invention can use an ordinary TV camera commonly obtainable and connected typically to a home computer via the USB or IEEE 1394 ports. Such a board/card serves as sort of a physical touch screen or pad which while not able to display programmed inputs, can none the less be changed and can provide limited graphics and lettering features. It is also easy to use and understand, in stark contrast to the overly computer-technical art of today.

Another advantage is that it the board or card used can be printed out from home computer inputs or downloaded internet sources. Alternatively, it can be cut out for example from newspaper ads or the backs of cereal boxes. (just to illustrate a few classic possibilities).

A powerful, yet simple input device results for complete programs including macros of all kinds which are similarly generated to execute instructions desired. In one case the program commands exist as printed code on a piece of paper, in one preferred embodiment. The paper can be a newspaper clipping, and the codes can be like data matrix codes or any other code sufficiently capacity to carry the program instructions desired while being accurately read by the TV camera used to digitize the image of the code on the paper or other medium.

Information immediately useful to humans can also be printed on the card which carries the program code—a key advantage of the invention. Such human readable information can be alphanumeric characters, Chinese characters (and related), pictures, diagrams or the like, as well as purely decorative data such as company logos or scenes.

The cards of the invention in effect create a new form a data storage and interface, suitable for single mission use and wide distribution in conventional methods understandable to the vast majority of the populace.

While the card of the invention can be used for a single use, it is also possible to use the card again and again—like a record. Automatic selection of multiple cards in a system of this type, in this case a magazine of cards in the dash can be provided for example in a manner similar to cassette storage and play of CDs (the JVC system). Alternatively a place for storage of cards can be provided in the vehicle or elsewhere, and the cards manually removed and inserted.

As well, a single camera could be arranged to simultaneously read two cards placed side by side, allowing a used to jump back and forth between them, or use one or the other as desired.

It is noted that the embodiments herein and in our co-pending applications have emphasized TV cameras to read cards and touch interfaces. This is not necessarily required, and many aspects of the invention can be accomplished by other means. For example, the card of the invention could carry its program or data information using magnetic stripes or other conventional media, albeit at somewhat higher cost. The touch readout aspect of the card can be accomplished using for example ultrasonic waves to determine the presence of the finger on the card at a certain location (see also referenced applications by one of the inventors, as well as granted us patents referenced).

In one desirable aspect, it is proposed that all touched points on a particular class of cards can be typically always in the same place and thus easy to learn after changing cards in a given application environment, such as in an automobile, or an oven, or whatever.

It is noted that the card of the invention can serve still more uses. For example it can be an inventory or build control card, traveling with an object such a vehicle on a production line. Such cards exist today and are typically bar coded and read at a station. But in this case, not only can it be read, but instructions for its application can be entered via touch by the operator when the card is placed in a slot at the station control panel The card can also have a great deal of printing on it associated with its use by the user, independent of its computer function Logos, Colored pictures of sale items, etc.

It is possible that the TV camera described in the invention above is built like that of a fax machine or desktop scanner, namely with a moving scan in one direction of a linear photodetector array. For reading data this can provide higher resolution, but is slower for tactile determination.

It is noted that the embodiments herein and in our co-pending applications have emphasized TV cameras to read cards and touch interfaces. This is not necessarily required, and many aspects of the invention can be accomplished by other means. For example, the card of the invention could carry its program or data information using magnetic stripes or other conventional media, albeit at somewhat higher cost. The touch readout aspect of the card can be accomplished using for example ultrasonic waves to determine the presence of the finger on the card at a certain location (see also referenced applications by one of the inventors, as well as granted us patents referenced).

It also should be noted that while automotive applications have been highlighted, because of their need for tactile function, the invention is usable for a multitude of purposes beyond the car. Several were discussed in our co-pending applications (with out the tactile aspect), and they range from point of sale devices, to Information kiosks, to home automation and control functions, to factory controls, etc.

The invention allows one to take ones own card/interface with you, for example inserting it in a rental car (assuming all cars have standardized slots for this purpose)

It is also possible to make a cellular phone utilizing a card of the invention, which has many wireless uses, and can be dealt with simply by ordinary people clipping cards as described. This is probably by necessity somewhat larger than a normal cell phone, as it includes a TV camera, which however also has other camera based applications for acquiring video pictures, as will be illustrated. (see also referenced co-pending application "Camera based . . . " by Tim Pryor which illustrates applications of a cell phone with a TV camera)

The card system can load the phone with the programs relating to a particular aspect of ones life, or for use over a particular time period (e.g. a day). The tactile aspect allows the user to feel for the program commands and other features, without interrupting other activities such as business, conversation or the like.

In a cell phone of this type the camera may serve several purposes, for example of ordinary use as in the co-pending case to take pictures for wireless transmission, and to see the card of the invention.

The invention may be retrofitted easily to an existing vehicle. A housing can contain an LCD or other display, a voice pickup microphone and, a connection to the cars audio system for voice output and a card slot for a card of the invention. The retrofitted system is typically placed on a stand sticking up from the transmission hump area, which can also include a location for a palm pilot or other PDA, and/or cell phone if separate It is envisioned that "Palm pilot" or other PDA can be run using a card of the invention, by connecting the computer to the palm device, using known protocol means.

The invention can be used for other automation control purposes, such as machine tool control. For example a card of the invention can be shipped along with some semi-finished parts to a CNC machine tool station (or other working station) which is to finish the parts. The card is put into the slot of the control as in the dash examples above, and both the program needed for that part, and the specialized operator control touch elements needed for that part are accessed by the machine computer and used to perform the operation.

This same rational can be used for any operation, whether in a factory or elsewhere, where the control system for an operation is to be used on a specific basis for a given part or batch. Alternatively, the operator can go to a storage of cards and pull the card needed for a given part or operation One can combine with the input from the card, voice or gesture recognition to allow the user to signal other actions in conjunction with the card.

It is further noted that the methods of detecting touch disclosed in FIGS. 2 and 9 are able to detect the touch of multiple points at once—a major advantage over conventional touch devices such as SAW devices or resistive or capacitive overlays. This allows unique advantages. For example functions to be touched can be interconnected in their operation. It is possible to with one finger touch a point on a card of the invention signifying a person, while with the thumb or other finger touch a icon signifying a telephone (thus commanding the computer of the car to call that person). While this could be done in sequence, it is often easier to just rest ones fingers simultaneously.

In addition, one can simplify the dashboard in this manner. One can touch a radio button, and a increase button. If both at once, it is not just an error, and the radio can seek added stations in the increasing direction. If I touch a heat button, and the increase button, the system computer can increase the heat in the car.

Another advantage of being able to sense the touching two (or even "N") points at once, is that by touching two points say, one can unambiguously indicate that a completely new function of any subsequent touches is to be interpreted—like touching the control-Alt keys simultaneously on a keyboard.

One application of the invention is a home computer A TV camera can be placed by the user in a variety of positions at will, so as to image and obtain information from cards or other objects large and small, through lens adjustment of fields of view or by changing object distance and adjusting focus (if not fixed focus).

Another application is a kiosk in a mall. A user has seen an ad in a newspaper and clipped it out. She sticks the add in the slot on the kiosk, and all data on stores in the mall that relate to that add is displayed. She in this case does not need to touch the card, but rather the touch screen conventional controls or icons.

Another application is a point of sale device (also in combination if desired with a bar code scanner) in which the card represents specials of the day which have been entered. These specials can also be brought on a card by the customer to the point of checkout and inserted into the device.

Another application is a point of sale device in a clothing store, or the home. In this case, the display provides, for example, a large, full size, and thus realistic, view of the apparel when the card is inserted. The individual data as to cost specials etc. is on the card, and touch selectable by the user—who has seen the basic advertisement. This saves stepping thru menus and other computer technical manipulations which many users find daunting.

Another application is an oven application of the invention. A housewife cuts a recipe out of a newspaper, and places it in transparent card holder on her oven. On the side of the card facing the housewife is the written instructions for use, and touch button or other pictures for her to control the operation. On the back, facing a camera in a manner disclosed above, is the program data as disclosed heretofore. A clear screen covering the front side has a surface which can be pushed on the proper areas of the recipe instructions.

In one scenario the housewife pushes a pictograph showing spices on the front of the card. The data provided by the card allows the computer of the oven to then query a special spice internet site to obtain the best spice mix for the desired recipe of the card, taking into account the spices available in the local stores accessed by the housewife, and any measuring information associated therewith.

A Quant has an associated ID (identification number) which can be used as a look-up key in an associated database to find the associated program commands, parameters, objects, actions, etc. as well as the defining characteristics of the Quant.

A Three Dimensional object like a toy fire truck can also be used with the invention, where the child just touches a portion of the truck to indicate to the camera computer system information of interest. In a crude sense, this can be sensed in two dimensions with a single TV camera, but for most resolution, a three-D stereo pair of TV cameras can be used, as taught in our co-pending application.

While the preferred sensor for use with the invention is a TV camera, or in many cases a color TV camera and even a stereo pair of such cameras, other electro-optical sensors may be used. One of these utilizes a scanning laser beam which is swept in raster, polar, or other sweep fashion over the surface of the member or human interrogated. The return signal at each point is detected by a photo-detector, whose data is combined with that of the scanner positions to develop a TV camera like image. By using triangulation techniques, such an image can also be provided in three dimensions (that is x, y and range). One such scanner is provided by Hymarc company of Ottawa, Canada, who also can provide same with a color sensing capability.

"Light" as used herein includes all electro-magnetic wavelengths from ultraviolet to near infrared

We claim:

1. A method for a person to input data into a computer, comprising the steps of:

providing a member having a plurality of printed matters on a surface thereof, said printed matters including at least one coded information;

using an electro-optical sensor, continually sensing said at least one coded information of the printed matters on the member, and sensing physical interactions of said person with the printed matters on the surface of said member;

analyzing outputs of said sensor to determine locations of said interactions of said person with the printed matters on the surface of said member;

determining, from the analyzed outputs when a location of one of the interactions of said person with the printed matters on the surface of said member is with said at least one coded information; and when the location of the one of the interactions of said person with said at least one coded information on the surface of said member occurs, inputting desired data into the computer.

2. A method according to claim 1, wherein illumination is provided by a non-planar light source.

3. A method according to claim 1, including the further step of considering a data base of said printed matters in making said analysis.

* * * * *